United States Patent [19]

Gooch

[11] Patent Number: 4,495,838

[45] Date of Patent: Jan. 29, 1985

[54] REVERSE PRESELECT CONTROL

[75] Inventor: Douglas C. Gooch, Galesburg, Mich.

[73] Assignee: Eaton Corporation, Cleveland, Ohio

[21] Appl. No.: 331,393

[22] Filed: Dec. 16, 1981

[51] Int. Cl.³ .................. B60K 41/10; F16H 3/08; F16H 5/42

[52] U.S. Cl. .................. 74/869; 74/331; 74/336 R; 74/359; 74/861

[58] Field of Search .......... 74/869, 868, 867, 864, 74/752 C, 335, 336 R, 359, 339, 364, 360, 329, 331, 861

[56] References Cited

U.S. PATENT DOCUMENTS

| | | | |
|---|---|---|---|
| 2,972,899 | 2/1961 | Wiggermann | 74/329 |
| 2,974,766 | 3/1961 | Perkins et al. | 74/335 |
| 3,293,932 | 12/1966 | Boydell et al. | 74/339 |
| 4,186,618 | 2/1980 | Richards | 74/339 |
| 4,192,196 | 3/1980 | Bogema et al. | 74/339 |
| 4,194,410 | 3/1980 | Richards | 74/339 |
| 4,221,283 | 9/1980 | Nordkvist et al. | 74/339 X |
| 4,257,284 | 3/1981 | Ashaner et al. | 74/339 |
| 4,346,626 | 8/1982 | Kawamoto | 74/861 X |
| 4,378,710 | 4/1983 | Knödel | 74/339 |

FOREIGN PATENT DOCUMENTS

| | | | |
|---|---|---|---|
| 626020 | 8/1961 | Canada | 74/339 |
| 2644113 | 4/1978 | Fed. Rep. of Germany | 74/360 |
| 42754 | 4/1981 | Japan | 74/867 |
| 833227 | 4/1960 | United Kingdom | 74/331 |

Primary Examiner—Allan D. Herrmann
Assistant Examiner—Stephen B. Andrews
Attorney, Agent, or Firm—C. H. Graze; P. S. Rulon

[57] ABSTRACT

Disclosed is an automatic control system for a powershift, preselect transmission (10) including a plurality of power paths (36, 38) alternately connectable between input (12) and output (20) shafts by first engaging selected ones of synchronizer clutches (42, 74, 84) associated with each of a plurality speed ratio gears (44, 46, 76, 78, 80) in each path and then alternately engaging a powershift clutch (48, 82) associated with each path. The control system includes a hydraulic logic system (118) which may be electronic and a hydraulic and shift valve system which may be electrically controlled should the logic be electronic. The control system preselects ratio gears in a nondriving path and then alternately engages the powershift clutches to switch driving connections from one path to the other. The logic system includes an improved reverse sequence valve (132) and improved shift valves (124, 126, 128). The shift valve system includes the feature of trimmer valves (364, 370, 372, 374) to control the engagement rate of the synchronizer clutches and combination trimmer valves (360, 366) to control the engagement rate of the powershift clutches.

The logic system further includes the feature of preselecting reverse when a manual shift valve (700) is in the neutral position.

7 Claims, 16 Drawing Figures

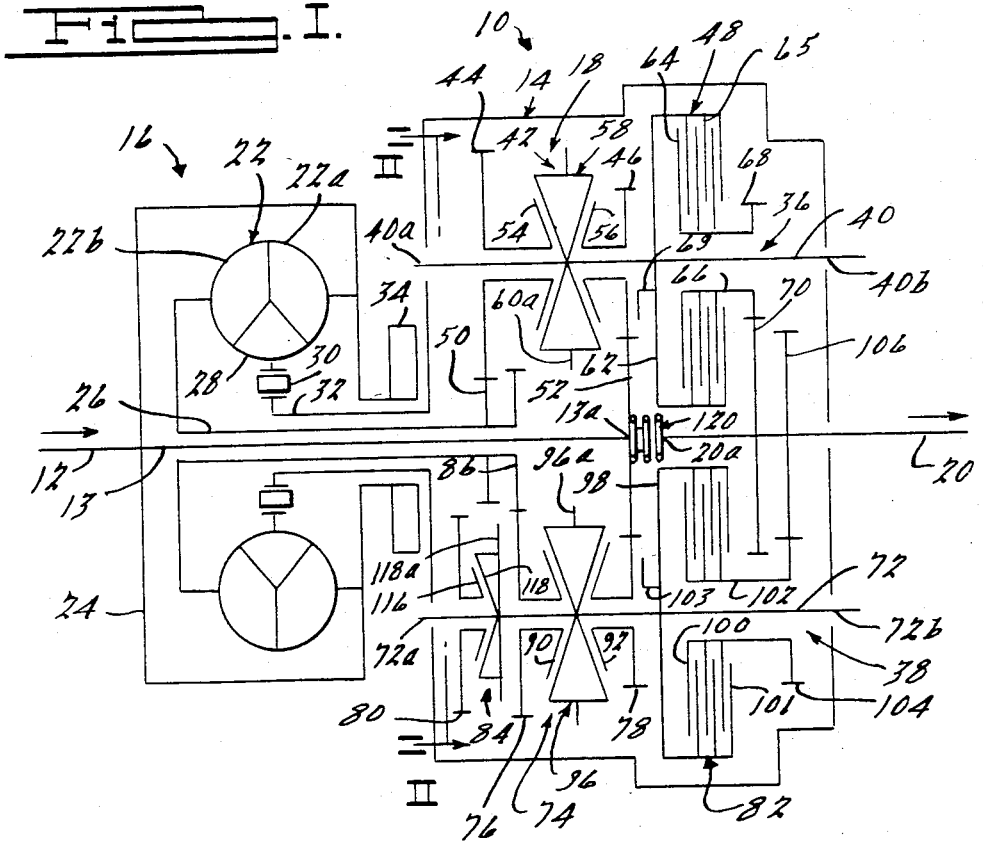
Fig. I.
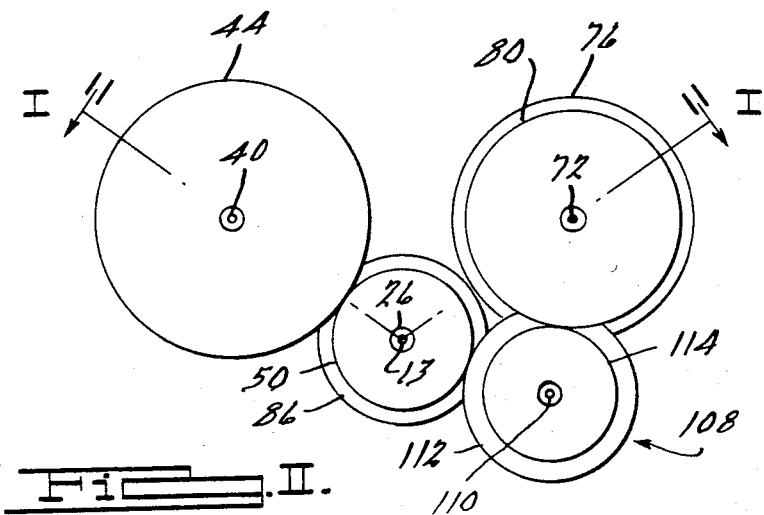
Fig. II.

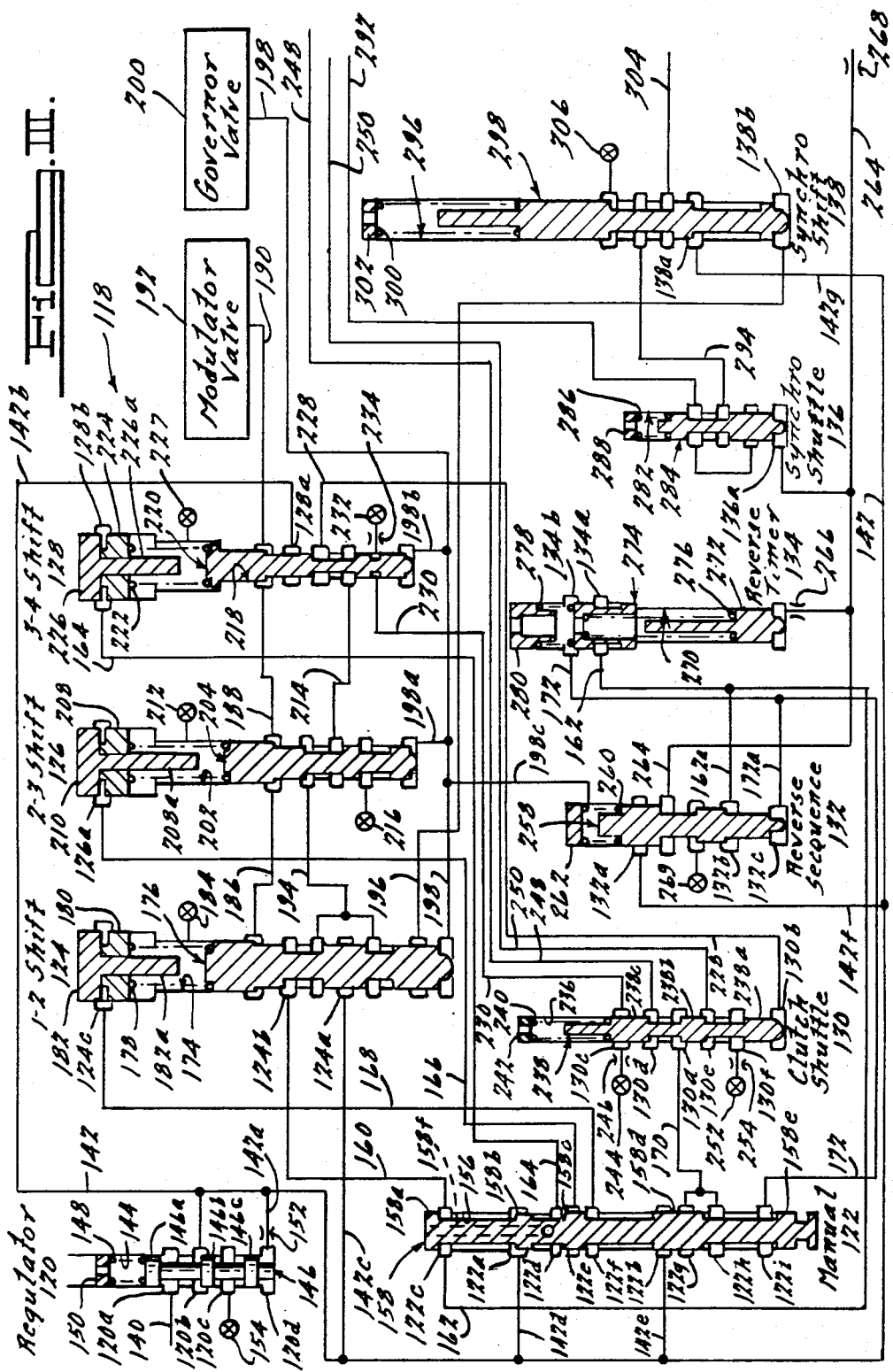

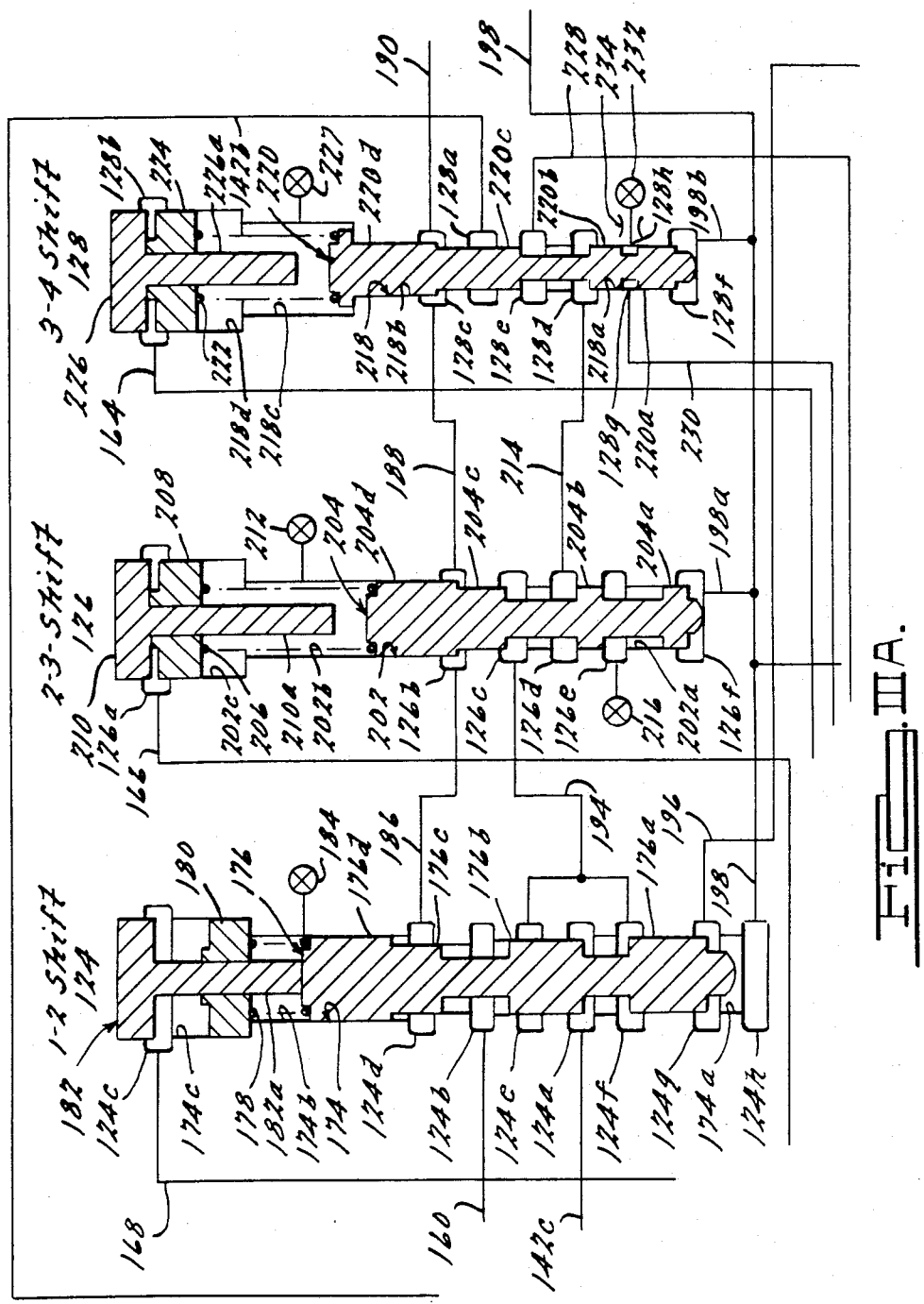
Fig. IIA.

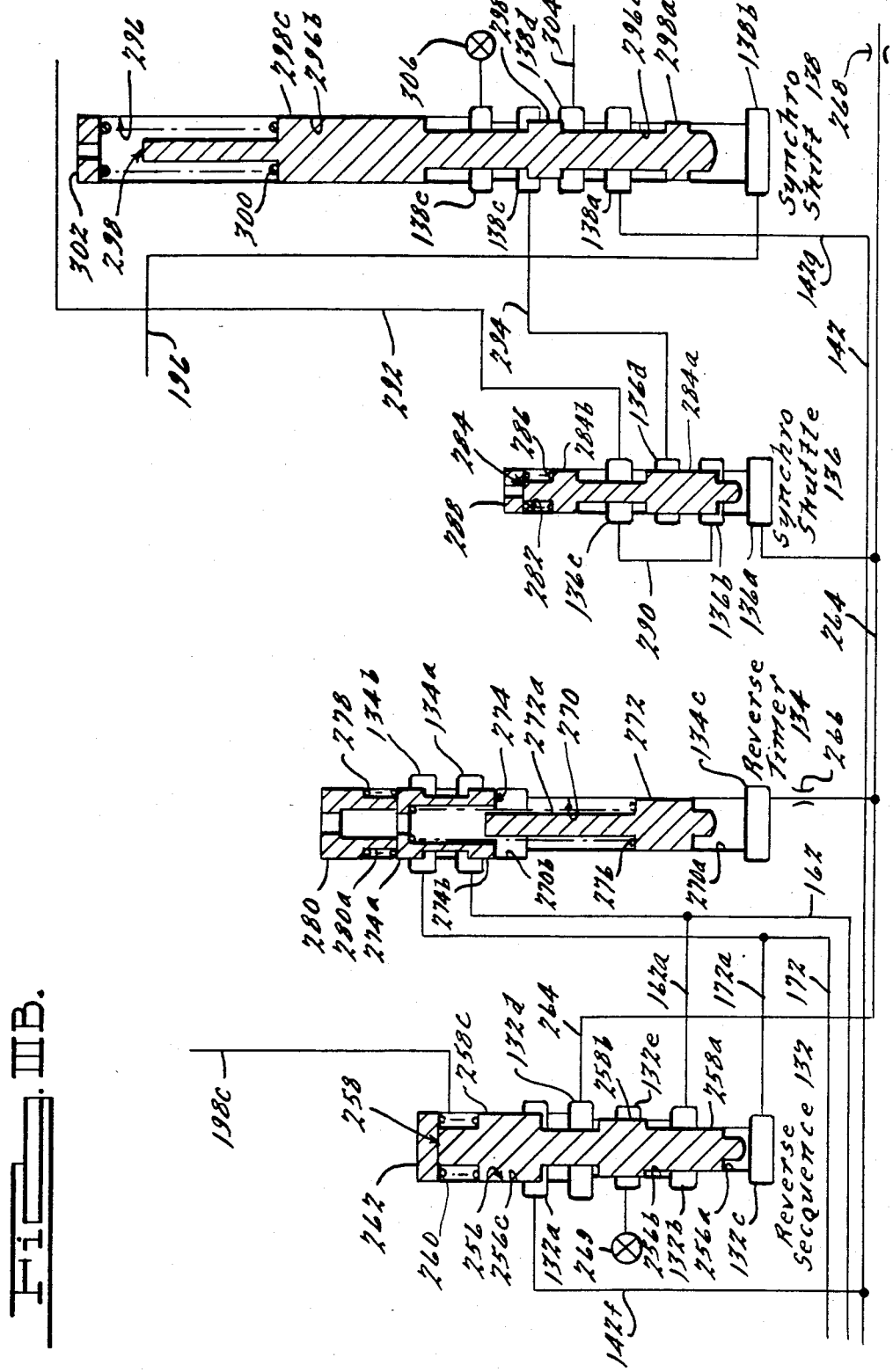

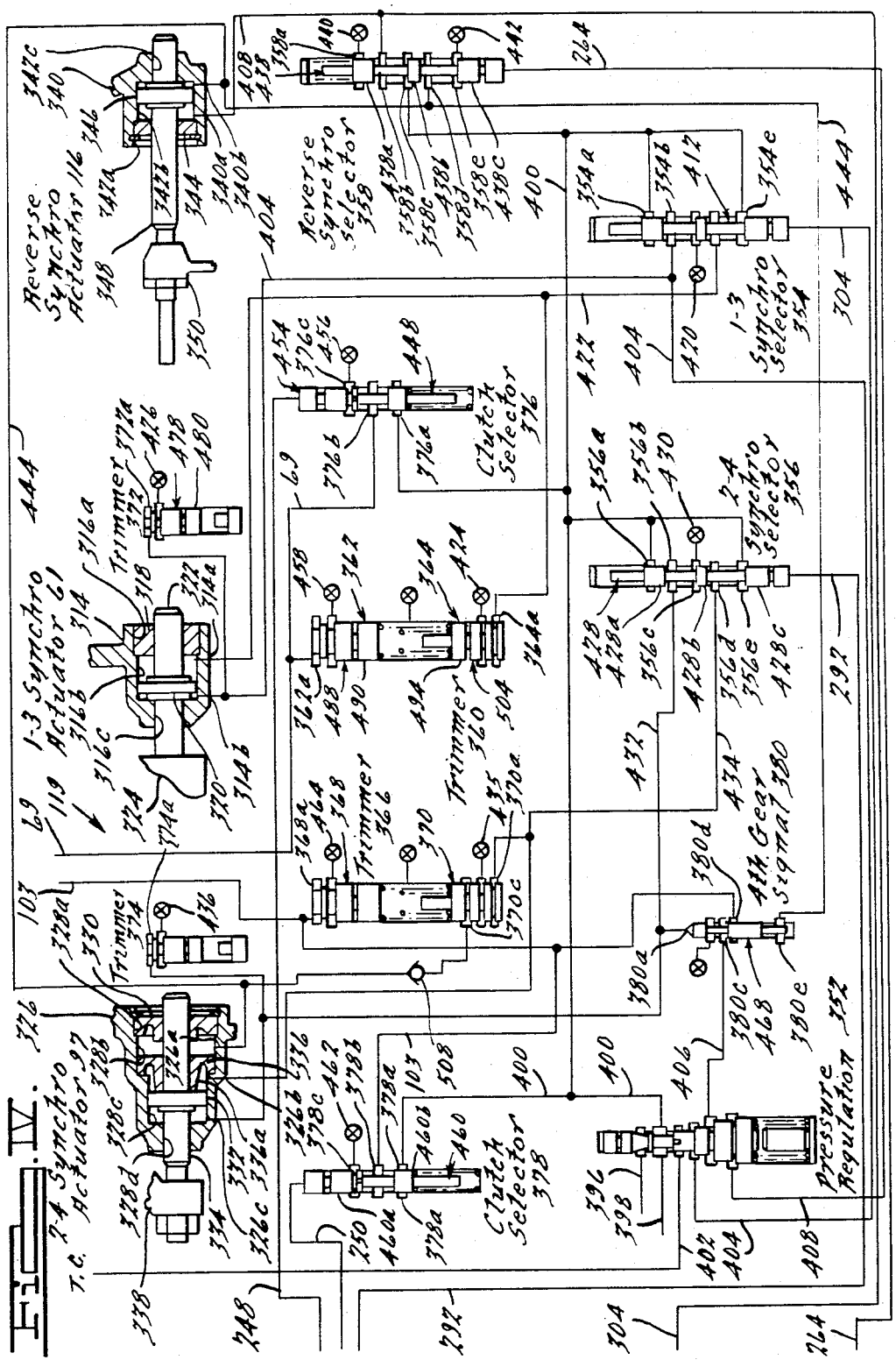

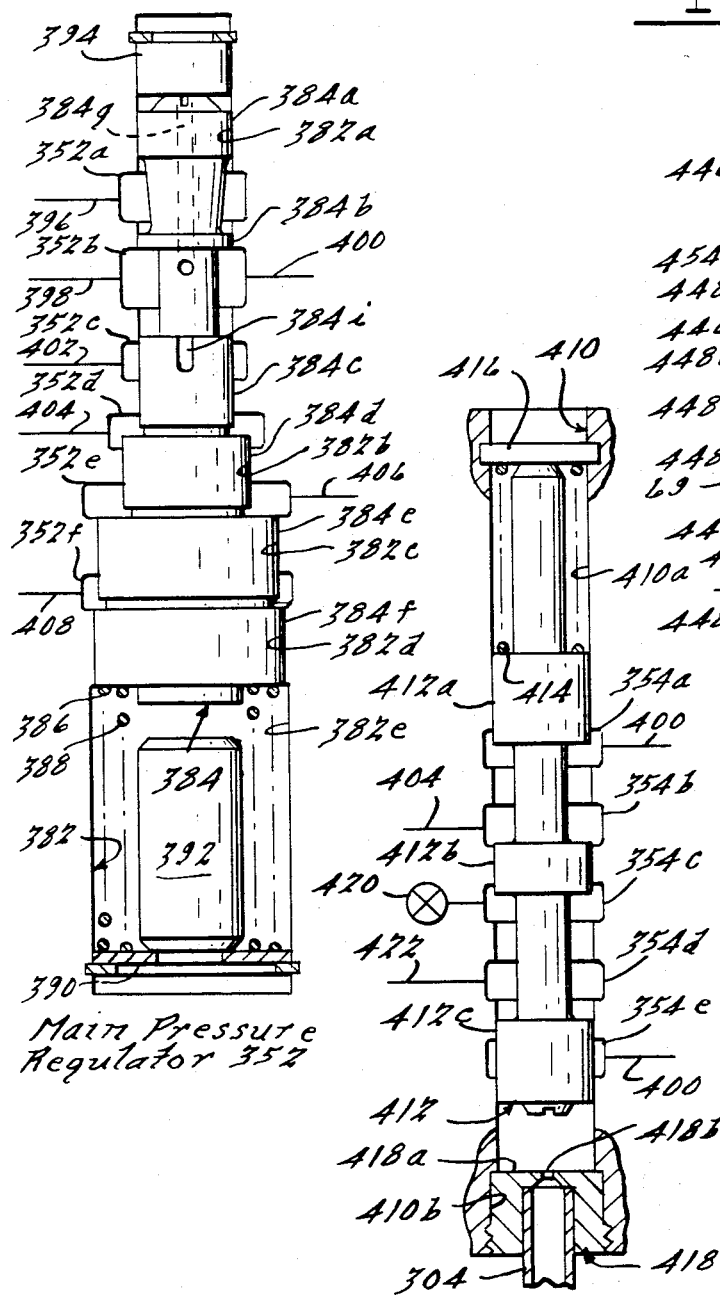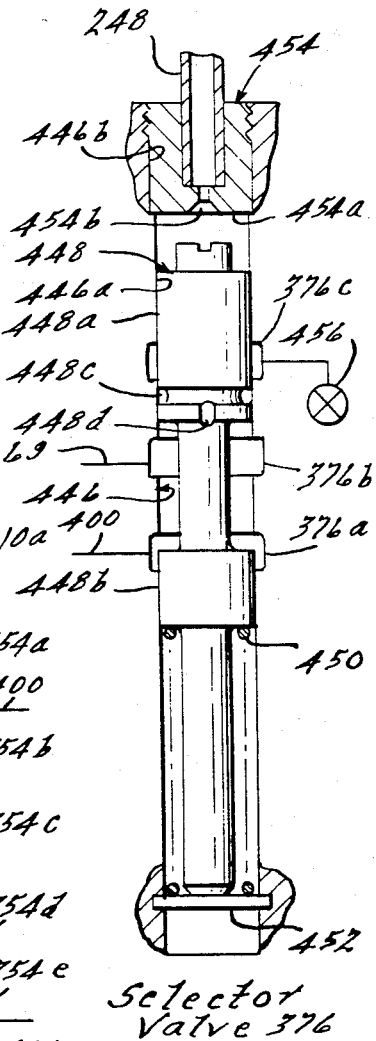

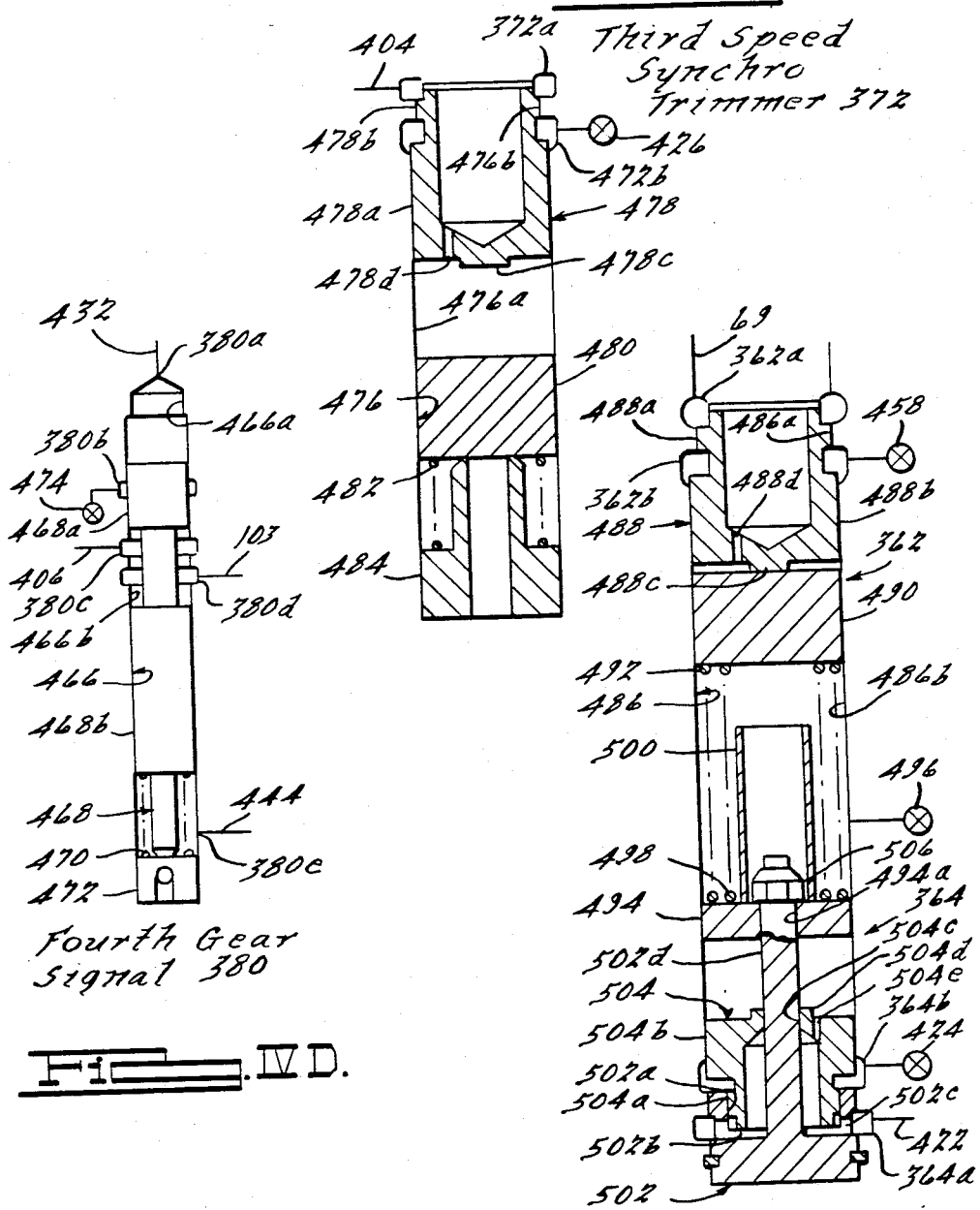

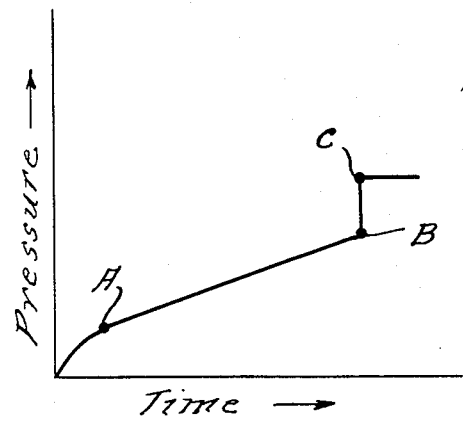
FIG. V.
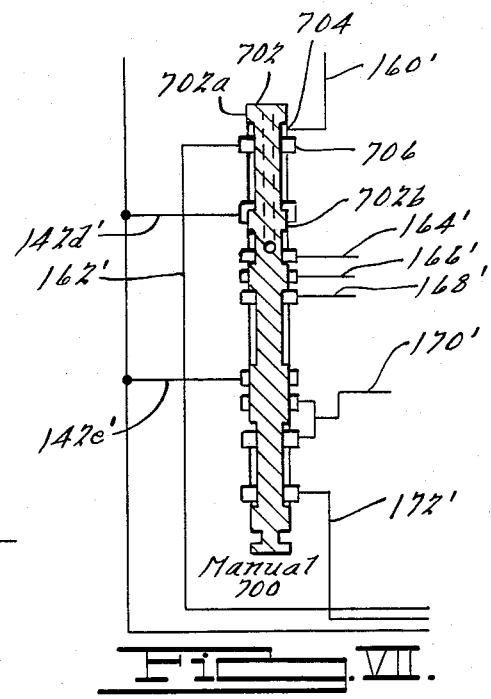
FIG. VII.
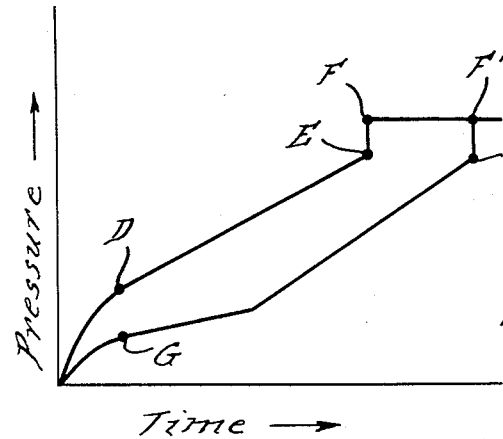
FIG. VI.
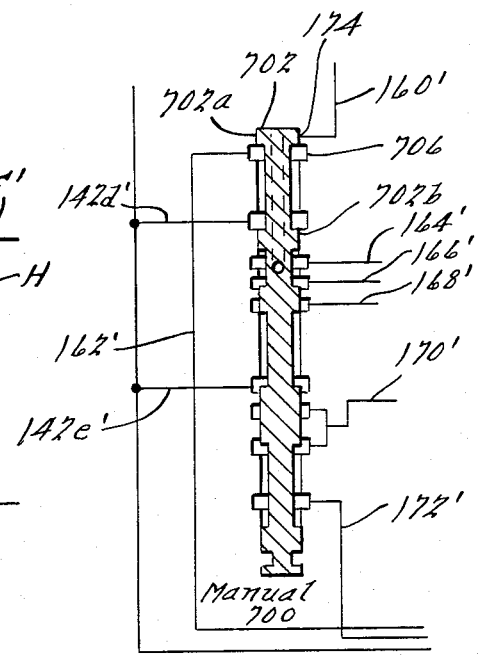
FIG. VIII.

REVERSE PRESELECT CONTROL

CROSS-REFERENCE TO RELATED APPLICATIONS

The invention of this application relates to U.S. Pat. No. 4,246,993; U.S. application Ser. No. 178,429, filed Aug. 15, 1980 and now U.S. Pat. No. 4,375,171; and U.S. application Ser. Nos. 331391, 331392, 331394, 331395, 331396, 331397, all filed 12/15/81. All of the above are assigned to the assignee of this application and all are incorporated herein by reference.

FIELD OF THE INVENTION

The invention relates to a reverse control for a preselect transmission. More specifically, the invention relates to a fluid or hydraulic control having means to preselect a reverse speed ratio when a shift selector means is in neutral.

BACKGROUND OF THE INVENTION

Preselect, powershift transmissions of the type having a plurality of multiple ratio power paths alternately connected between input and output shafts are well-known. Such transmissions are well-suited for road vehicles since they may be made relatively compact and inexpensive and since they may be readily powershifted by both manual and automatic controls. Many of these transmissions include two countershafts each defining a power path, two or more ratio gears rotatably mounted on each countershaft with at least one of the gears on one countershaft being a reverse gear and with all of the gears in constant driving relation with the output shaft, a synchronizer clutch associated with each gear and engagable to clutch one gear at a time to each respective countershaft, and two powershift clutches alternately engaged to complete driving connections between the input and output shafts.

Controls for such transmissions (particularly automatic controls) readily provide for automatic, power upshifting and downshifting in the forward speed ratios by establishing a driving connection through one path, engaging or preselecting the next upshift or downshift ratio gear in the other or nondriving path, and then switching the driving connection from the one path to the other path by substantially simultaneously engaging and disengaging the powershift clutches respectively associated with the other path and the one path.

However, controls of such transmissions have not readily provided for preselection of the reverse gear. Hence, whenever a transmission operator moves a shift selector to the reverse position a noticeable time delay occurs while the controls first engage the reverse gear synchronizer clutch and then the powershift clutch.

SUMMARY OF THE INVENTION

An object of this invention is to provide a preselect transmission control which preselects a reverse speed ratio gear whenever a shift selector is in neutral.

According to a feature of the invention, a preselect transmission includes a plurality of multiple ratio gear power paths alternately connectable between input and output shafts by first engaging selected ones of clutch means associated with each gear and then alternately engaging a powershift clutch associated with each path in response to an improved control system including a shift selector moveable between forward, neutral, and reverse positions; and a device operative to effect engagement of the clutch means associated with a reverse speed ratio gear in one of the paths in response to the shift selector being in the neutral position.

According to another feature of the invention, a transmission includes input and output shafts; a plurality of power paths disconnectable from both shafts; a plurality of forward speed ratio gears associated with one path and in constant driving relation with one of the shafts; at least one forward and one reverse speed ratio gear associated with another path and in constant driving relation with the one shaft; clutch means associated with each gear and selectively engageable to connect one of the gears with the associated path while the path is otherwise disconnected from the shafts; a powershift clutch associated with each path and alternately engageable to complete driving communications between the shafts via the selected one gears for up, down, and reverse shifting the transmission; an improved control system including a shift selector and a reverse sequence device; the shift selector is movable between forward, neutral, and reverse positions; and the reverse sequence device is operative to effect engagement of the clutch means associated with the reverse speed ratio gear in response to neutral positioning of the shift selector.

BRIEF DESCRIPTION OF THE DRAWINGS

A preselect transmission and a control system therefore is illustrated in the accompanying drawings in which:

FIG. I is a schematic view of the transmission, looking in the direction of arrows I—I in FIG. II;

FIG. II is a schematic view of the transmission, looking in the direction of arrows II—II in FIG. I;

FIG. III is a somewhat schematic view of a hydraulic logic system of the transmission control system;

FIGS. III-A and III-B are enlarged views of several of the valves in FIG. III;

FIG. IV is a somewhat schematic view of a shift valve system of the control system;

FIGS. IV-A through IV-F are enlarged views of several of the valves in FIG. IV;

FIGS. V and VI schematically illustrate pressure rise curves or pressure rise paths of trimmer valves in FIGS. IV, IV-E, and IV-F; and FIG. VII and VIII illustrate an alternative embodiment of a manual shift valve in FIG. III.

Certain terminology referring to environment and specific types of components, direction, motion, and relationship of components to each other will be used in the following description. This terminology is for convenience in describing the invention and should not be considered limiting unless it is explicitly used in the claims.

DETAILED DESCRIPTION OF THE DRAWINGS

Looking first at FIGS. I and II, therein is schematically illustrated a two countershaft transmission 10 including four forward speed ratio gears and one reverse speed ratio gear. The transmission controls disclosed in the additional figures are designed to automatically effect power shifting of the four forward speed ratios between the first and fourth speed ratios and to effect power shifting between the first and reverse speed ratios.

Transmission 10 includes an input shaft 12 which may be directly driven by an unshown internal combustion engine; a housing assembly 14; a torque converter assembly 16; a ratio change gear assembly 18 driven by input shaft 12 through torque converter assembly 16 in first, second, and reverse speed ratios and driven directly by a bypass input shaft 13 in third and fourth speed ratios; and an output shaft 20 axially aligned with input shaft 12.

The torque converter assembly 16 is conventional in that it includes a fluid coupling of the torque converter type having an impeller 22a driven by input shaft 12 through a shroud 24, a turbine 22b hydraulically driven by the impeller and in turn driving a sleeve shaft 26 extending into gear assembly 18, and a runner or stator 28 which becomes grounded to housing 14 via a one-way roller clutch 30 carried by a sleeve shaft 32 fixed to housing assembly 14. Shroud 24 also drives a pump 34 for pressurizing the torque converter, for lubricating the transmission, and for selectively actuating clutches in gear assembly 18 via controls to be described hereinafter.

Sleeve 26 provides a fluid powered or torque converter driven shaft for first, second, and reverse ratio gears in gear assembly 18. Bypass shaft 13 is in continuous direct drive with input shaft 12 and provides a torque converter bypass for driving third and fourth ratio gears; this arrangement of the bypass shaft negates the need for a separate torque converter bypass clutch.

Looking now at FIGS. I and II, the schematically illustrated ratio change gear assembly includes two power paths or countershaft assemblies 36 and 38 disposed about axes parallel to and radially outward of an axis defined by shafts 12, 13, and 20. Assembly 36 includes a shaft 40 rotatably supported in unshown bearings at its ends 40a and 40b by housing assembly 14, a double acting synchronizer-jaw clutch 42, first and third speed ratio gears 44 and 46 rotatable relative to and supported by shaft 40, and a hydraulically actuated friction clutch 48. First speed ratio gear 44 is driven by and in continuous mesh with an input drive gear 50 which is nonrotatably secured to torque converter driven shaft 26. Third speed ratio gear 46 is driven by and in continuous mesh with an input drive gear 52 which is nonrotatably secured to bypass shaft 13. Synchronizer-jaw clutch 42 may be a double acting synchronizer clutch such as shown in previously mentioned application Ser. No. 178,429 and now U.S. Pat. No. 4,375,171. Briefly, clutch 42 includes a clutch member 54 at one end which is nonrotatably secured to gear 44, a clutch member 56 at the other end which is nonrotatably secured to gear 46, and a center clutch member 58 at the center which is nonrotatably secured to shaft 40. Center clutch member 58 may be slidably shifted leftwardly or rightwardly in a conventional manner to respectively couple gear 44 or 46 to shaft 40. Such slidable shifting of the center clutch member frictionally couples countershaft 40 with one of the ratio gears to effect synchronism and then positively clutches the shaft with the gear via a jaw clutch. Center clutch member 58 includes a radially extending flange portion 60a gripped by an unshown shift fork to effect the leftward and rightward shifting in a conventional manner in response to movement of a piston in a 1-3 synchro actuator 61 shown in FIG. IV. Friction clutch 48 includes a housing member 62 nonrotatably secured to shaft 40, two sets of interdigitated disks 64 and 65, and a sleeve shaft 66 rotatably supported by shaft 40. Disks 64 are nonrotatably secured to sleeve shaft 66 and disks 65 are nonrotatably secured to housing member 62. Both disk sets are axially moveable in housing 62 and are frictionally interconnected in response to hydraulic pressure being selectively applied to an unshown piston in the housing member 62 via a line 69. Sleeve shaft 66 is nonrotatably secured to a drive gear 68 which is rotatably supported by shaft 40. Drive gear 68 is in continuous mesh with an output gear 70 which is nonrotatably secured to output shaft 20.

Countershaft assembly 38 differs from assembly 36 mainly in that it also includes a reverse ratio gear 80. Assembly 38 includes a shaft 72 rotatably supported in unshown bearings at its ends 72a and 72b by housing assembly 14, a double acting synchronizer-jaw clutch 74, second, fourth and reverse speed ratio gears 76, 78, 80 which are rotatable relative to and supported by shaft 72, a hydraulically actuated friction clutch 82, and a reverse synchronizer-jaw clutch 84. Second speed ratio gear 76 is driven by and in continuous mesh with an input drive gear 86 which is nonrotatably secured to torque converter driven shaft 26. Fourth speed ratio gear 78 is driven by and in continuous mesh with the input drive gear 52 which, as previously mentioned, is nonrotatably secured to bypass shaft 13. Synchronizer-jaw clutch 74 is a double acting clutch and may be identical to synchronizer-jaw clutch 42. Synchronizer-jaw clutch 74 includes a clutch member 90 at one end which is nonrotatably secured to gear 76, a clutch member 92 at the other end which is nonrotatably secured to gear 78, and a center clutch member 96 at the center which is nonrotatably secured to shaft 72. Center clutch member 96 may be slidably shifted leftwardly or rightwardly in a conventional manner to respectively couple gear 76 or 78 to shaft 72. Such slidable shifting of the center clutch member frictionally couples countershaft 72 with one of the ratio gears to effect synchronism and then positively clutches the countershaft with the gear via a jaw clutch. Center clutch member 96 includes a radially extending flange portion 96a gripped by an unshown shift fork to effect the leftward and rightward shifting in a conventional manner in response to movement of a piston in a 2-4 synchro actuator 97 shown in FIG. IV. Friction clutch 82 may be identical to friction clutch 48. Friction clutch 82 includes a housing member 98 which is nonrotatably secured to shaft 72, two sets of disks 100 and 101, and a sleeve shaft 102 rotatably supported by shaft 72. Disks 100 are nonrotatably secured to sleeve shaft 102 and disks 101 are nonrotatably secured to housing member 98. Both disk sets are axially movable in housing 98 and are frictionally interconnected in response to hydraulic pressure being selectively applied to an unshown piston in housing member 98 via a line 103. Sleeve shaft 102 is nonrotatably secured to a drive gear 104 which is rotatably supported by shaft 72. Drive gear 104 is in continuous mesh with an output gear 106 which is nonrotatably secured to output shaft 20.

Reverse gear 80 is rotatably supported by shaft 72 and is driven by an idler gear assembly 108, seen only in FIG. II. Idler gear assembly 108 includes a shaft 110 nonrotatably supported by housing assembly 14, a gear 112 rotatably supported on shaft 110 and in continuous mesh with the input drive gear 50 driven by torque converter driven shaft 26, and a gear 114 rotatably supported on shaft 110 and nonrotatably secured to gear 112. Gear 114 is in continuous mesh with reverse gear 80. Sunchronizer-jaw clutch 84 may be a single acting synchronizer clutch such as shown in previously mentioned U.S. Pat. No. 4,246,993. Briefly, clutch 84 includes a clutch member 116 secured to gear 80 and a clutch member 118 nonrotatably secured to shaft 72. Member 118 may be slidably shifted leftwardly in a conventional manner to couple gear 80 to shaft 72. Such slidable shifting of member 118 frictionally couples countershaft 72 with gear 80 to effect synchronism and then positively clutches the shaft with the gear via a jaw clutch. Member 118 includes a radially extending flange portion 118a gripped by an unshown shift fork to effect leftward and rightward shifting in a conventional manner in response to movement of a piston in a reverse synchro actuator 116 shown in FIG. IV.

By way of example, the ratios of ratio change gear assembly 18 are: first gear—4.05, second gear—2.22, third gear—1.42, fourth gear—1.00, and reverse gear—4.76.

From the foregoing one should note that only one speed ratio gear can be clutched to each countershaft at a given time and that the transmission is input synchronized through the synchronizer-jaw clutches, that is, synchronizing power for the countershafts comes from the torque converter driven shaft for the first, second, and reverse speed ratios, and from the bypass shaft for the third and fourth speed ratios. While drive through the transmission is via one countershaft, a ratio gear on the other countershaft is synchronized and jaw clutched thereto; the transmission may then be power shifted from one speed ratio gear or countershaft by simultaneously disengaging one of the multiple disk, friction clutches 48 or 82 and engaging the other.

The transmission of FIGS. I and II may be broadly defined as a preselect, powershift transmission including a plurality of multiple ratio gear (44, 46, 76, 78, 80) power paths (36, 38) alternately connectable between input (12) and output (20) shafts by first engaging (preselecting) selected ones of clutch means (42, 74, 84) associated with each gear and then alternately engaging a powershift clutch (48, 82) associated with each path.

Controls for automatically power shifting the transmission include a hydraulic logic system 118 shown in FIG. III and a hydraulic shift valve system 119, shown in FIG. IV. Shift valve system 119, which also includes some logic functions, is discussed separately from hydraulic logic system 118 since the shift valve system is readily interfaced with an electrical or electronic logic system in lieu of the hydraulic logic system and therefore may be considered separate and distinct.

In the following description of the controls, the material or structure defining the valve bores and the passages interconnecting the bores is not shown to simplify the drawings.

HYDRAULIC LOGIC SYSTEM 118

Looking first at the hydraulic logic system 118 in FIG. III, therein is a pressure regulator 120; a shift selector means or manual valve 122; forward speed shift valves designated 1-2 shift valve 124, 2-3 shift valve 126, and 3-4 shift valve 128; a 1-2 clutch shuttle valve 130; a reverse sequence valve 132; a reverse timer valve 134; a synchro shuttle valve 136; and a synchro shift valve 138.

Manual valve 122 is controlled by a vehicle operator. Shift valves 124, 126, and 128 initiate alternate automatic power shifting of friction clutches 48 and 82 in response to vehicle speed and throttle position. Shuttle valve 130 alternately effects engagement and disengagement of friction clutches 48 and 82 in response to position of the shift valves. Reverse sequence valve 132, reverse timer valve 134, synchro shuttle 136, and restriction 268 cooperate to sequence disengagement or neutral positioning of synchronizer-jaw clutch 74 prior to engagement of reverse synchronizer-jaw clutch 84, to delay engagement of friction clutch 82 during the sequencing, and to hold reverse synchronizer-jaw clutch 84 engaged to allow power shifting between the first and reverse speed ratios when the vehicle speed is below a predetermined amount. Synchro shift valve 138 initiates automatic sequential engagement of the forward speed ratios in response to vehicle speed and in cooperation with the position of valves 124 and 136.

PRESSURE REGULATOR VALVE 120

Regulator 120 receives a source of pressurized hydraulic oil via a line 140 from pump 34 and regulates the fluid at a reduced pressure in a line 142. Regulator 120 includes a bore 144 blind at its lower end and having annular parts 120a–120d, a spool or valving member 146 having lands 146a–146c, and a spring 148 biasing the spool downward and reacting against a vented stop 150 which exhausts the space containing spring 148. The blind end of bore 144 and stop 150 limit travel of the spool. Port 120a communicates with the source of pressurized hydraulic oil via the line 140. Line 142 in turn communicates regulated pressure from port 120b directly with port 120d via a branch line 142a and a restriction 152. Line 142 also communicates the regulated pressure with an annular port 128a of 3-4 shift valve 128 via a branch line 142b, with a port 124a of 1-2 shift valve 124 via a branch line 142c, with annular ports 122a and 122b of manual valve 122 via branch lines 142d and 142e, with an annular port 132a of reverse sequence valve 132 via a branch line 142f, and with an annular port 138a of synchro shift valve 138 via a branch line 142g. Port 120c communicates with an exhaust 154.

The force of spring 148 and the counter force of the hydraulic pressure acting on the bottom of spool 146 varies the amount of communication between ports 120a and 120b via the annular space between lands 146a and 146b to regulate the hydraulic pressure in line 142 at the desired amount, for example 40–50 psi (2.8–3.5 kgm/sq.cm). Any excess pressure in line 142 moves land 146c upward enough to intercommunicate ports 120b and 120c and vent the excess pressure to exhaust 154. Restriction 152 dampens pressure surges which could cause flutter of spool 146.

MANUAL VALVE 122

Valve 122 includes a bore 156 open to exhaust at both ends and having annular ports 122a–122i, and a spool 158 having lands 158a–158e. A drilled passage 158f in the spool communicates the space between lands 158b and 158c to exhaust. The lower end of spool 158 is adapted in a conventional manner to be connected via an unshown linkage to an unshown shift selector controlled by a vehicle operator. However, spool 158 could be controlled by some other means. Spool 158 is incrementally moveable downward by the shift selector from a reverse drive position, as shown, to a neutral position; to a forward drive position for normal automatic upshift and downshift between first and fourth; to an inhibit or third speed ratio position for normal automatic upshift and downshift between first and third with inhibited automatic shifts into and out of fourth; to a second speed ratio position for normal automatic upshift and downshift between first and second with inhibited automatic shifts into and out of third and fourth; and to a first speed ratio position for normal first speed operation and inhibited automatic shifts into and out of second, third, and fourth.

Looking at ports 122a–122i from top to bottom, port 122c communicates via a line 160 with an annular port 124b of 1-2 shift valve 124. Port 122c also communicates via a reverse signal line 162 with an annular port 134a of reverse timer valve 134 and via a branch line 162a with an annular port 132b of reverse sequence valve 132. Port 122a communicates directly with regulated pressure in branch line 142d. Port 122d communicates via a line 164 with an annular port 128b of 3-4 shift valve 128. Port 122e communicates via a line 166 with an annular port 126a of 2-3 shift valve. Port 122f communicates via a line 168 with an annular 124c of 1-2 shift valve 124. Port 122b communicates directly with regulated pressure in branch line 142e. Ports 122g and 122h communicate in parallel via a line 170 with an annular port 130a of 1-2 clutch shuttle valve 130. And port 122i communicates via a line 172 with an annular port 134b of reverse timer 134 and via a branch line 172a with an annular port 132c of reverse sequence valve 132.

With spool 158 in the reverse position, as shown, the annular space between lands 158a and 158b communicates regulated pressure from port 122a to port 122c which in turn communicates via lines 160, 162 and 162a with ports 124b, 134a, and 132b. Also the space between lands 158d and 158e communicates port 122h with port 122i, which ports in turn respectively communicate via line 170 with port 130a and via lines 172 and 172a with ports 134b and 132c. Further, port 122d communicates via drilled passage 158f with exhaust. All other ports are blocked from intercommunication by the lands.

With spool 158 in the neutral position, land 158a is below port 122c, thereby exposing port 122c directly to exhaust, and land 158e is disposed below the lower end of bore 156, thereby exposing ports 122h and 122i to exhuast via the space between lands 158d and 158e. Ports 122d and 122e communicate via drilled passage 158f with exhaust. All other ports are blocked from intercommunication by the lands.

With spool 158 in the forward drive position, ports 122c, 122d, 122e, and 122i continue to communicate with exhaust. Additionally, port 122f communicates with exhaust via drilled passage 158f and land 158d now blocks port 122h. Further, the space between lands 158c and 158d communicates regulated pressure from port 122b to port 122g. With spool 158 in the drive position the logic system and shift valve system may then effect automatic upshifts and downshifts in the four forward speeds as a function of vehicle speed and throttle position.

With spool 158 in the third speed ratio position, ports 122c, 122e, 122f, and 122i continue to communicate with exhaust, port 122h remains blocked by land 158d, and port 122b continues to communicate with port 122g. However, port 122d is now blocked from exhaust by land 158b and is now communicated with regulated pressure at port 122a via the space between lands 158a and 158b. Hence, regulated pressure now flows to port 128b of 3-4 shift valve 128 via line 164 to raise the shift point of valve 128 and thereby inhibit automatic shifts into and out of the fourth speed in a manner to be explained hereinafter.

With spool 158 in the second speed ratio position, ports 122c, 122f, and 122i continue to communicate with exhaust. The space between lands 158c and 158d now communicates regulated pressure to both ports 122g and 122h with no change in fluid flow since line 170 is connected to both ports. However, port 122e is now blocked from exhaust by land 158b along with port 122d. Hence, regulated pressure also flows to port 126a of 2-3 shift valve 126 via line 166 to also raise the shift point of valve 126 and thereby inhibit automatic shifts into and out of both the third and fourth speed ratios in a manner explained hereinafter.

With spool 158 in the first speed ratio position, only port 122c continues to communicate with exhaust, port 122i is blocked by land 158d, and the space between lands 158c and 158d continues to intercommunicate ports 122b, 122g, and 122h. However, port 122f is now blocked from exhaust by land 158b along with ports 122d and 122e. Hence, regulated pressure also flows to port 124c of 1-2 shift valve 124 via line 168 to also raise the shift point of valve 124 and thereby inhibit automatic shifts into and out of the second, third, and fourth speed ratios in a manner explained hereinafter.

1-2 SHIFT VALVE 124

Valve 124, which is shown enlarged in FIG. III-A, includes a stepped bore 174 having axially aligned bore portions 174a–174c of successively increasing diameter and annular ports 124a–124h, and a stepped spool 176 biased downward by a spring 178 which reacts against an annular or doughnut-shaped inhibit piston 180 slidably disposed in bore portion 174c. In FIG. III-A spool 176 is actuated up and piston 180 is actuated down to illustrate, respectively, the second speed ratio position of spool 176 and the inhibit position of piston 180. The bottom of bore portion 174a is blind and the top of bore portion 174c is sealed by a plug 182 having a downwardly projecting stop portion 182a slidably received by the opening in annular piston 180. The space containing spring 178 is vented by an exhaust 184. Spool 176 includes from bottom to top lands 176a–176c of equal diameter and a land 176d of greater diameter. Port 124c communicates directly with a space between piston 180 and plug 182. Port 124d continuously communicates with a throttle modulation pressure via a line 186, an annular port 126b, a line 188, an annular port 128c, and a line 190 which receives hydraulic pressure inversely proportional to throttle position or manifold pressure via a conventional modulator valve 192. Port 124b, as previously mentioned, communicates with port 122c of the manual valve via line 160 and receives regulated pressure only when the manual valve spool 158 is in the reverse position. Ports 124e and 124f communicate in parallel via a Y-line 194 with an annular port 126c. Port 124a is connected directly to regulated pressure in branch line 142c. Port 124g is connected via a line 196 to an annular port 138b of synchro shift valve 138. Port 124h continuously communicates via a line 198 with a hydraulic governor pressure which increases in proportion to vehicle speed and which is produced by a governor valve 200 in a conventional manner.

Spool 176 is basically a two position valving member. When the downward force of spring 178 acting on spool 176 exceeds the upward force of the governor pressure acting on the bottom area of the spool plus the upward force of the modulator pressure acting on the spool shoulder formed by the difference in diameter of lands 176c and 176d, spool 176 will be in the downward or first speed ratio position. As the combined upward forces from the governor and modulator pressures increase in response to vehicle speed and throttle position, spool 176 will shift upward toward stop 182a to effect a 1-2 upshift into the second speed ratio position. Conversely, the spool shifts downward to effect a 2-1 downshift as the combined governor and modulator pressures decrease.

When manual valve 122 ports regulated pressure to port 124c via line 168, piston 180 moves downward against the shoulder formed by the difference in diameter of bore portions 174c and 174b, thereby increasing the biasing force of spring 178 on spool 176 and raising or inhibiting the shift point of spool 176 for a given combination of governor and modulator pressures. Since the rate of spring 178 and the stroke of piston 180 may be accurately controlled, the up-and-down shift points of spool 176 are also accurately controlled without concern or need to control the hydraulic pressure used to raise or inhibit the shift points.

2-3 SHIFT VALVE 126

Valve 126 is much like valve 124 and is also shown enlarged in FIG. III-A. The valve includes a stepped bore 202 having bore portions 202a–202c of successively increasing diameter and annular ports 126a–126f, and a stepped spool 204 biased downward by a spring 206 which reacts against an annular or doughnut-shaped inhibit piston 208 slidably disposed in bore portion 202c. The bottom of bore portion 202a is blind and the top of bore portion 202c is sealed by a plug 210 having a downwardly projecting stop portion 210a fixed thereto and slidably received by the doughnut opening in piston 208. The space containing spring 206 is vented by an exhaust 212. Spool 204 includes from bottom to top lands 204a–204c of equal diameter and a land 204d of greater diameter. Port 126a communicates directly with a space between piston 208 and plug 210. As previously mentioned, port 126b continuously communicates with hydraulic pressure inversely proportional to throttle position (modulator pressure) and port 126c communicates with ports 124e and 124f via line 194. Port 126d communicates via a line 214 with a port 128d of 3-4 shift valve 128. Port 126e vents the space between lands 204a and 204b to an exhaust 216. Port 126f continuously communicates via a branch line 198a with the governor pressure proportional to vehicle speed.

The operation of valve 126 is substantially the same as valve 124. Spool 204 is shifted from its downward or second speed ratio position to its upward or third speed position merely by a higher combination of governor and modulator pressures. Piston 208 is shifted downward against the shoulder defined by the difference in diameter between bore portions 202b and 202c in response to regulated pressure (i.e., an inhibit signal) at port 126a via line 166.

3-4 SHIFT VALVE 128

Valve 128 is much like valves 124 and 126 and is also shown enlarged in FIG. III-A. The valve includes a stepped bore 218 having bore portions 218a–218d of successively increasing diameter and annular ports 128a–128f, and a stepped spool 220 biased downward by a spring 222 which reacts against an annular or doughnut-shaped inhibit piston 224 slidably disposed in bore portion 218d. The bottom of bore portion 218a is blind and the top of bore portion 218d is sealed by a plug 226 having a downwardly projecting stop portion 226a fixed thereto and slidably received by the doughnut opening in piston 224. The space containing spring 222 is vented by an exhaust 227. Spool 220 includes, from bottom to top, lands 220a–220c of equal diameter and a land 220d of greater diameter. Port 128b communicates directly with a space between piston 224 and plug 226 and receives regulated pressure only when the manual valve spool 158 is in the third speed ratio position. As previously mentioned, port 128c continuously communicates with hydraulic modulator pressure inversely proportional to throttle position, port 128a continuously communicates with regulated pressure via branch line 142b, and port 128d communicates with port 126d via line 214. Port 128e communicates via a line 228 with an annular port 130b of 1-2 clutch shuttle valve 130. Port 128f continuously communicates via a branch line 198b with governor pressure proportional to vehicle speed. A nonannular port 128g on the left side of bore portion 218a communicates via a line 230 with an annular port 130c of 1-2 clutch shuttle valve 130. A nonannular port 128h, diametrically opposite port 128g, is connected to an exhaust 232 via a restriction 234.

Operation of valve 128 is substantially the same as valves 124 and 126; spool 220 is shifted from its downward or third speed ratio position to its upward or fourth speed ratio position merely by a higher combination of modulator and governor pressures. Piston 224 is shifted downward against the shoulder defined by the difference in diameter between bore portions 218c and 218d in response to regulated pressure (i.e., an inhibit signal) at port 128b via line 164.

1-2 CLUTCH SHUTTLE VALVE 130

Valve 130 includes a straight bore 236 blind at its lower end and having annular ports 130a–130f, a spool 238 having lands 238a–238c, and a spring 240 biasing the spool downward and reacting against a vented stop 242 which exhausts the space containing spring 240. As previously mentioned, port 130c communicates via a line 230 with a port 128g of 3-4 shift valve 128, port 130a communicates via a line 170 with ports 122g and 122h, and port 130b communicates via line 228 with port 128e of 3-4 shift valve 128. Port 130c also communicates with an exhaust 244 via a restriction 246. Port 130d communicates via a line 248 with a clutch 48 selector valve in the hydraulic shift valve system to be described hereinafter. Port 130e communicates via a line 150 with a clutch 82 selector valve in the hydraulic shift valve system, also to be described hereinafter. For now it should suffice to say that the presence of hydraulic pressure in either line 248 or 250 initiates an action in the shift valve system to effect a controlled engagement of the respective friction clutch 48 or 82, provided one of corresponding ratio gears has been synchronized and jaw clutched to the countershaft of the friction clutch to be engaged. Further, the absence of hydraulic pressure in either line 248 or 250 initiates a controlled disengagement of the respective friction clutch. Port 130f communicates with an exhaust 252 via a restriction 254.

Restrictions 234 and 246, associated respectively with valves 128 and 130, control the disengagement rate of clutch 48 during 1-2 upshifts and 3-2 downshifts. During 3-4 upshifts spool 220 of 3-4 shift valve 128 is up, whereby land 220a blocks communication between ports 128g and 128h. Hence, only restriction 246 controls the disengagement rate of clutch 48 during 3-4 upshifts. Restriction 254 controls the disengagement rate of clutch 82 during 2-1 and 4-3 downshifts and during 2-4 upshifts.

In a manner more fully explained hereinafter, the downward position of spool 238 communicates line 248 with line 170 via port 130d, the space between lands 238b and 238c, and port 130a, whereby regulated pressure flows to line 248 when spool 158 of manual valve 122 is in the drive, third, second, or first speed ratio positions and when spool 158 is in the reverse position provided the, as yet unexplained, reverse timer valve 134 is timed out, i.e., the spool therein is actuated to its up position. The down position of spool 238 also communicates line 250 with exhaust 252 via port 130e, the space between lands 238a and 238b, port 130f, and restriction 254. The up position of spool 238 communicates line 250 with line 170 via port 130e, the space between lands 238a and 238b, and port 130a, whereby regulated pressure flows to line 250 when spool 158 is in the as mentioned position. The up position of spool 238 also communicates line 248 with exhaust 244 via port 130d, the space between lands 238b and 238c, port 130c, and restriction 246; when spool 220 of 3-4 shift valve 128 is down line 248 also vents to exhaust 232 via restriction 234 in parallel with restriction 246, as explained in the preceeding paragraph.

In a manner more fully explained hereinafter, shift valves 124, 126, and 128 block the flow of hydraulic pressure to shift spool 238 upward when line 250 is to be depressurized and line 248 is to be pressurized for shifts into the first and third speed ratios. Shift valves 124, 126, and 128 allow the flow of hydraulic pressure to shift spool 238 upward when line 248 is to be depressurized and line 250 is to be pressurized for shifts into reverse, second, and fourth.

REVERSE SEQUENCE VALVE 132

Valve 132, which is shown enlarged in FIG. III-B, includes a stepped bore 256 blind at its lower end and having bore positions 256a–256c of successively increasing diameter and annular ports 132a–132e, a stepped spool 258 having lands 258a–258c of successively increasing diameter, and a spring 260 biasing spool 258 downward and reacting against a plug 262 which seals the top of the bore. The space containing spring 260 continuously communicates via a branch line 198c with the governor pressure proportional to vehicle speed. As previously mentioned, port 132a continuously communicates with regulated pressure via branch line 142f of line 142, port 132b communicates with port 122c via branch line 162a of line 162, and the port 132c communicates via branch line 172a of line 172 with port 122i of manual valve 122. Port 132d communicates via a line 264 with an annular port 134c of reverse timer valve 134 through a restriction 266, with an annular port 136a of synchro shuttle valve 136, and with a reverse on/off selector valve through a restriction 268. The reverse on/off selector valve forms part of the hydraulic shift valve system to be described hereinafter. For now it should suffice to say that the presence of hydraulic pressure in line 264 initiates engagement of reverse synchronizer-jaw clutch 84 and that the absence of hydraulic pressure initiates disengagement of the reverse synchronizer-jaw clutch. Port 132e communicates with an exhaust 269.

The down-and-up positions of spool 258 correspond respectively to disengagement and engagement states of valve 132 and in turn correspond respectively to the disengaged and engaged positions of the reverse speed ratio. As previously mentioned, spool 258 is continuously biased downward by spring 260 and governor pressure which varies with vehicle speed. When manual valve spool 158 is placed in the reverse position, regulated pressure (via port 122c) acts upward on a first shoulder defined by the difference in diameter of lands 258a and 258b. The upward force of the regulated pressure acting on this first shoulder is sufficient to shift the spool to its full up position when the downward force of the governor pressure is proportional to a predetermined amount, e.g., approximately 3 miles per hour (4.8 kilometers per hour). With spool 258 in the up position, as shown in FIG. III-B, regulated pressure at port 132a is communicated via the space between lands 258b and 258c and port 132d to line 264 to initiate a reverse speed ratio engagement sequence. Further, the regulated pressure acts on a second shoulder defined by the difference in diameter of lands 258b and 258c. The upward force of the regulated pressure acting on this second shoulder is sufficient, independent of the upward force from the first shoulder, to latch the spool in the up position when the governor pressure is proportional to approximately 6 miles per hour (9.6 kilometers per hour). Hence, once valve spool 258 is moved up or to the engagement state, it will remain up independent of changes in the position of manual valve spool 158 for vehicle speed less than 6 miles per hour. In a manner to be explained in greater detail hereinafter, the latched position of spool 258 facilitates power shifting the transmission between the first and reverse speed ratios when manual valve spool 158 is moved between reverse and drive to effect a rocking motion of the vehicle.

REVERSE TIMER VALVE 134

Valve 134, which is also shown enlarged in FIG. III-B, includes a stepped bore 270 having bore portions 270a–270b and annular ports 134a–134c, a piston 272 having an extension 272a, an open centered spool 274 allowing passage of piston extension 272a and having lands 274a–274b, a spring 276 reacting between piston 272 and spool 274, a spring 278 reacting between spool 274 and an open centered stop 280 having a cylindrical extension portion 280a which limits upward movement of spool 274. Bore 270 is blind at its lower end and the spaces containing springs 276 and 278 are vented by the open center of stop 280. As previously mentioned annular port 134b communicates via line 172 with annular port 122i of manual valve 122 and with port 132c via branch line 172a, port 134a communicates via line 162 with port 122c and with port 132b via branch line 162a, and port 134c communicates through restriction 266 with port 132d via line 264.

Also, as previously mentioned, when the spool of reverse sequence valve 132 is shifted upward, in response to initial movement of manual valve spool 158 to the reverse position while the vehicle speed is less than 3 miles per hour, hydraulic pressure flows to line 264. The pressure in line 264 flows to port 134c via restriction 266 at a controlled rate and moves piston 272 up at a timed rate. After a predetermined time or delay the increasing force of spring 276 shifts spool 274 up, as shown in FIG. III-B, to cummunicate port 134a with port 134b via the space between lands 274a and a 274b, whereby hydraulic pressure at port 134a flows via line 172 and branch line 172a to port 132c of reverse sequence valve 132 to additionally latch spool 258 upward against governor pressures representative of vehicle speeds in the range of 18 miles per hour (28.9 kilometers per hour). The regulated pressure in line 172 also flows to port 122i of the manual valve and on through shuttle valve 130 to initiate engagement of powershift, friction clutch 82 in a manner previously mentioned. Should manual valve spool 158 move from the reverse position during vehicle speeds less than 6 miles per hour, reverse sequence valve spool 258 will remain in the latched or up position. Hence, the regulated pressure in line 264 will maintain spool 274 in the up position.

SYNCHRO SHUTTLE VALVE 136

Valve 136, which is also shown enlarged in FIG. III-B, includes a straight bore 282 blind at its lower end and having annular ports 136a-136d, a spool 284 having lands 284a-284b, and a spring 286 biasing the spool downward and reacting against an open centered stop 288 which vents the space containing spring 286 to exhaust. As previously mentioned, port 136a communicates with port 132d of reverse sequence valve 132 via line 264. Port 136b communicates via a line 290 with port 136c which in turn continuously communicates via a line 292 with a 2-4 synchro selector valve in the hydraulic shift valve system to be described hereinafter. For now it should suffice to say that the absence of hydraulic pressure in line 292 initiates engagement of the second speed ratio portion of synchronizer-jaw clutch 74 and that the presence of hydraulic pressure in line 292 initiates engagement of the fourth speed ratio portion of synchronizer-jaw clutch 74. Port 136d communicates via a line 294 with a port 138c of synchro shift valve 138. The presence of hydraulic pressure in line 264 shifts spool 284 up against stop 288, as shown in FIG. III-B, whereby land 284a uncovers port 136b to allow the flow of hydraulic pressure to line 292 via ports 136a and 136b, line 290, and port 136c. In the up position of spool 284, land 284a blocks port 136d.

SYNCRHO SHIFT VALVE 138

Valve 138, which is also shown enlarged in FIG. III-B, includes a stepped bore 296 having bore portions 296a-296b of successively increasing diameter, annular ports 138a-138e, a stepped spool 298 having lands 298a-298b of equal diameter and a land 298c of greater diameter, and a spring 300 biasing the spool downward and reacting against an open centered stop 302 which exhausts the space containing spring 300 and limits upward movement of spool 298. As previously mentioned port 138a communicates directly with regulated pressure via branch line 142g and line 142, port 138b communicates via line 196 with port 124g of 1-2 shift valve 124, and port 138c communicates via line 294 with port 136d of synchro shuttle valve 136. Port 138d communicates via a line 304 with a 1-3 synchro selector valve in the hydraulic shift valve system to be described hereinafter. For now it should suffice to say that the absence of hydraulic pressure in line 304 initiates engagement of the first speed ratio portion of synchronizer-jaw clutch 42 and that the presence of hydraulic pressure in line 304 initiates engagement of the third speed ratio portion of synchronizer clutch 42. Port 138e is connected to an exhaust 306.

OPERATION OF HYDRAULIC LOGIC SYSTEM 118

Looking now briefly at valves 136 and 138, spool 298 of valve 138 is progressively moved upward in response to increasing governor pressure supplied to the bottom of the spool via port 138b, line 196, port 124g, and port 124h when spool 176 of 1-2 shift valve 124 is up. For vehicle speeds below the 1-2 shift point of valve 124, land 176a of 1-2 shift valve 124 blocks the flow of governor pressure to the bottom of spool 298. Hence, spool 298 is in the down position shown and land 298b blocks the flow of regulated hydraulic pressure from port 138a to ports 138d and 138c, whereby there is no hydraulic pressure in lines 292 and 304 unless spool 284 of shuttle valve 136 is up. When spools 284 and 298 are down, the absence of pressure in lines 292 and 304 is ensured since both lines are vented to exhaust 306, whereby the shift valve system 119 initiates engagement of both the first and second speed ratio portions of synchronizer-jaw clutches 42 and 74 regardless of the position of spool 158 in manual valve 122.

When spool 158 of manual valve 122 is placed in any of the forward drive positions, the space between lands 158c and 158d communicates regulated pressure to ports 122g and 122h and on to line 248 to initiate engagement of clutch 48 via line 170, port 130a, the space between lands 238b and 238c, port 130d, line 248 and as yet undescribed valving in shift valve system 119. As vehicle or the transmission output speed increases, spool 176 of 1-2 shift valve 124 moves up and allows the flow of governor pressure to the bottom of spool 298 of synchro shift valve 138 to start upward movement of the spool. As the governor pressure increases in response to a further increase in vehicle speed, land 298a moves to a position, see FIG. III-B, communicating regulated pressure from port 138a, to port 138d via the space between lands 298a and 298b prior to a 2-3 upshift of 2-3 shift valve spool 204, thereby anticipating a 2-3 upshift to initiate disengagement of the first speed ratio portion of synchronizer-jaw clutch 42 and to initiate (i.e., preselect) engagement of the third speed ratio portion of synchronizer-jaw clutch 42 prior to the 2-3 upshift of valve 126. When spool 204 of valve 126 upshifts, land 204b of spool 204 will block the flow of regulated pressure to the bottom of spool 238 of 1-2 clutch shuttle valve 130 via port 126c, line 214, port 128d, the space between lands 220b and 220c, port 128e, line 228, and port 130b. At the same time the space between lands 204a and 204b communicates this same series of ports and lines to exhaust 216 to facilitate a quick down shuttle of spool 238 and therefore a flow of regulated pressure to line 248 to initiate engagement of clutch 48 via valving in shift valve system 119 for the 2-3 upshift.

As the governor pressure further increases in response to a continued increase in vehicle speed, land 298b further moves to a position wherein the space between lands 298a and 298b also communicates regulated pressure to port 138c and on to line 292 via the previously described path prior to a 3-4 upshift of valve spool 220 in 3-4 shift valve 128, thereby anticipating a 3-4 upshift to initiate disengagement of the second speed ratio portion of synchronizer-jaw clutch 74 and to initiate (i.e., preselect) engagement of the fourth speed ratio portion of synchronizer-jaw clutch 74 prior to a 3-4 upshift of valve 128. When spool 220 of valve 128 upshifts, land 220b blocks port 128d to isolate the path to exhaust 216 for line 228 and land 220c unblocks port 128a to communicate regulated pressure to upshift shuttle valve spool 238 via the space between lands 220b and 220c, port 128e, line 228, and port 130b. Downshifting is basically the reverse of upshifting.

When the spool 158 of manual valve 122 is placed in the reverse position, regulated pressure immediately flows to the bottom of shuttle valve spool 238, to port 132b of reverse sequence valve 132, and to port 134a of reverse timer valve 134. The flow path to the bottom of shuttle valve spool 238 is via port 122c, line 160, port 124b, the space between lands 176b and 176c, port 124e, line 194, port 126c, the space between lands 204b and 204c, port 126d, line 214, port 128d, the space between lands 220b and 220c, port 128e, line 228, and port 130b; this path, of course, is blocked if spool 176 is up. The flow path to port 132b of reverse sequence valve 132 and port 134a of reverse timer valve 134 is via port 122c, line 162, and branch line 162a. The flow of regulated pressure to line 250 is delayed by reverse timer valve 134 to allow disengagement of the second and fourth speed ratio jaw clutch portions of synchronizer-jaw clutch 74 and engagement of reverse synchronizer-jaw 84 clutch. The regulated pressure on port 132b acts on the first shoulder of spool 258 and shifts the spool up if vehicle speed is less than the previously mentioned 3 miles per hour. When spool 258 shifts up, regulated pressure flows to line 264 to start the timed movement of piston 272 of reverse timer valve 134, to upshift of spool 284 of shuttle valve 136 for allowing the flow of regulated pressure to line 292 and for blocking the flow of regulated pressure to line 294, and to initiate engagement of the reverse synchronizer-jaw clutch through restriction 268 which delays engagement of the reverse synchronizer-jaw clutch. The regulated pressure in both lines 292 and 264 is used to center or neutrally position the three position piston in 2-4 synchro actuator 97 in a manner to be described hereinafter. When reverse timer 134 times out spool 274 upshifts and communicates regulated pressure on port 134a to line 250 to initiate engagement of powershift clutch 82. The flow path from port 134a to line 250 is via the space between lands 274a and 274b, port 134b, line 172, port 122i, the space between lands 158e and 158d, port 122h, line 170, and on to line 250, as previously described.

HYDRAULIC SHIFT VALVE SYSTEM 119

Looking now at shift valve system 119 of FIG. IV, therein is shown in addition to the shift valves, the previously mentioned 1-3 synchro actuator 61, 2-4 synchro actuator 97, and reverse synchro actuator 116.

The 1-3 synchro actuator 61, as previously mentioned, is a two position, piston type actuator. The actuator includes a housing 314 defining a stepped through bore having bore portions 316a–316c of successively decreasing diameter, an end plate 318 disposed in bore portion 316a and closing the right end of the bore, and a piston 320 slidably disposed in bore portion 316b and fixed or formed with a rod 322 slidably extending at one end through an opening in plate 318 and at the other end through bore portion 316c. The left end of rod 322 is fixed to a partially shown shift fork 324 which engages flange portion 60a of 1-3 synchronizer-jaw clutch 42 in a conventional manner. Ports 314a and 314b provide passages in the housing for directing hydraulic oil to and from opposite sides of piston 320.

When piston 320 is fully left in bore portion 316b, as shown, first speed ratio gear 44 is coupled to countershaft 40 by an unshown jaw clutch portion in clutch 42 and gear 46 is free to rotate relative to countershaft 40. When piston 320 is moved from left to right the jaw clutch portion coupling gear 44 to countershaft 40 disengages, the synchronizer and blocker portion of clutch 42 then frictionally coupled to the countershaft to third speed ratio gear 45 and blocks further rightward movement of piston 320 until gear 46 and countershaft 40 reach synchronism. When synchronism is reached, the blocker portion of clutch 42 unblocks and allows full rightward movement of piston 320, whereby the unshown jaw clutch portion engages to effect a positive coupling between third speed ratio gear 46 and countershaft 40. The first speed ratio gear 44 is synchronized and jaw clutched to countershaft 40 in the same manner in response to movement of piston 320 from right to left. Piston 320 is either full left or right.

The 2-4 synchro actuator 97, as previously mentioned, is a three position, piston type actuator. The actuator includes a housing 326 defining a stepped through bore having bore portions 328a–328d of successively decreasing diameter, an end plate 330 closing the right end of the bore, and a piston assembly including a piston 332 fixed or formed with a rod 334 and a piston 336 slidably disposed on rod 334. Pistons 332 and 336 are respectively disposed for sliding movement in bore portions 328c and 328b. Piston 336 includes an axially extending sleeve or stop ring portion 336a which limits leftward movement of piston 332 and moves piston 332 to the neutral position, as shown, when piston 336 abuts the shoulder defined by the difference in diameter of bore portions 328b and 328c. Rod 334 slidably extends at one end through an opening in plate 330 and at the other end through bore portion 328d. The left end of rod 334 is fixed to a partially shown shift fork 338 which engages flange portion 96a of 2-4 synchronizer-jaw clutch 74 in a conventional manner. Ports 326a–326c provide passages in housing 326 for directing hydraulic oil to and from opposite sides of pistons 332 and 336.

When piston 332 is in the neutral or center position, as shown, synchronizer-jaw clutch 74 is in neutral, whereby second and fourth speed ratio gears 76 and 78 are free to rotate relative to countershaft 72. When piston 332 is moved toward the left end of bore portion 328c, the synchronizer and blocker portion of clutch 74 frictionally couples countershaft 72 to second speed ratio gear 76 and blocks further leftward movement of piston 332 until gear 76 and countershaft 72 reach synchronism. When synchronism is reached, the blocker portion of clutch 74 unblocks and allows full leftward movement of piston 332 in bore portion 328c, whereby the unshown jaw clutch portion engages to effect a positive coupling between second speed ratio gear 76 and countershaft 72. The fourth speed ratio gear 78 is synchronized and jaw clutched to countershaft 72 in the same manner in response to movement of piston 332 rightwardly in bore portion 328c. To insure a neutral position of piston 332 pressurized oil is simultaneously communicated to ports 326a and 326c in a manner described hereinafter.

The reverse synchro actuator 116, as previously mentioned, is a two position piston type actuator. The actuator includes a housing 340 defining a stepped through bore having bore portions 342a–342c of successively decreasing diameter, an end plate 344 closing the right end of the bore, and a piston 346 slidably disposed in bore portion 342b and fixed or formed with a rod 348 slidably extending at one end through an opening in plate 344 and at the other end through bore portion 342c. The left end of rod 348 is fixed to a partially shown shift fork 350 which engages flange portion 118a of reverse synchronizer-jaw clutch 84 in a conventional manner. Ports 340a and 340b provide passages in the housing for directing hydraulic oil to and from opposite sides of piston 346.

When piston 346 is fully right in bore portion 342b, as shown, reverse speed ratio gear 80 is free to rotate relative to countershaft 72. When pressurized oil is communicated to the right side of piston 346 via port 340b, piston 346 moves leftwardly and the unshown synchronizer and blocker portions of clutch 84 frictionally couple countershaft 72 to reverse speed ratio gear 80 and block further leftward movement of piston 346 until gear 80 and countershaft 72 reach synchronism. When synchronism is reached, the blocker portion of clutch 84 unblocks and allows full leftward movement of the piston in bore portion 342b, whereby an unshown jaw clutch engages to effect a positive coupling between gear 80 and countershaft 72. When piston 396 is moved from left to right, the jaw clutch portion disengages gear 80. Hydraulic sealing of all three actuators is provided in a conventional manner.

Looking now specifically at the valves in shift valve system 119 of FIG. IV, therein is a main pressure regulator valve 352, a 1-3 synchro selector valve 354, a 2-4 synchro selector valve 356, a reverse synchro selector valve 358, a double or piggyback trimmer valve 360 including a 1-3 powershift clutch trimmer valve 362 and a 1st speed synchronizer clutch trimmer valve 364, a double trimmer valve 366 including a 2-4-reverse powershift clutch trimmer valve 368 and a 2nd speed synchronizer clutch trimmer valve 370, 3rd and 4th speed synchronizer clutch trimmer valves 372 and 374, clutch selector valves 376 and 378, and a fourth gear signal valve 380.

Synchro selector valves 354, 356, and 358 port regulated pressure to their associated synchro actuators in response to the absence or presence of hydraulic pressure in lines 264, 292, and 304 from hydraulic logic 118. Powershift clutch trimmers 362 and 368 in double trimmer valves 360 and 366 control the on coming rate of friction clutches 48 and 82 by controlling the rate of pressure rise of the hydraulic pressure actuating the friction clutches. Synchronizer clutch trimmer valves 364, 370, 372, and 374 control the rate of pressure rise in synchro actuators 61 and 97. Selector valves 376 and 378 port pressure to and from their associated powershift friction clutches to actuate and release the clutches in response to the presence and absence of pressure in lines 248 and 250 from hydraulic logic 118. Fourth gear signal valve 380 effects a lowering of the regulated pressure from regulator valve 352 when the transmission is to be shifted into the fourth speed ratio.

MAIN PRESSURE REGULATOR VALVE 352

Valve 352, which is shown enlarged in FIG. IV-A, includes a stepped bore 382 having bore portions 382a-382e of successively increasing diameter, annular ports 352a-352f, a stepped spool 384 having lands 384a-384f, springs 386 and 388 biasing the spool upward, an open centered member 390 secured in the bore by a snap ring to provide a reaction surface for the springs and a vent for the space containing the springs, a spacer tube 392 supported by member 390 and operative to limit downward movement of the spool, and a plug 394 secured in the bore by a snap ring for sealing the top of bore portion 382a and limiting upward movement of the spool. A drilled passage 384g in spool 384 communicates the space between lands 384b and 384c with the space between the top of spool 384 and plug 394. Lands 384a-384c are of equal diameter and lands 384d-384f are of successively increasing diameter. Land 384c includes axially extending notches 384i to ensure at least a restricted flow of oil from port 352b to port 352c when spool 384 is in the full upward position, as shown. Port 352a communicates via a line 396 with an unshown sump. Port 352b communicates via a line 398 with pressurized oil from pump 34. Port 352b also directly communicates via a main pressure line 400 and several same numbered branch lines with annular ports 354a and 354e of selector 354, with annular ports 356a and 356e of selector 356, with an annular port 358c of selector 358, with an annular port 376a of selector 376, and with an annular port 378a of selector 378. Port 352c communicates via a line 402 with torque converter 22 in a conventional manner. Port 352d communicates via a line 404 with port 314b of actuator 61, with an annular port 354b of selector 354, and with an annular port 372a of trimmer 372. Port 352e communicates via a line 406 with a nonannular port 380c of valve 380. And port 352f communicates via a line 408 with port 340a of actuator 116 and with annular port 358b of selector 358.

The force of springs 386 and 388 and the counter force of hydraulic pressure acting on the top of spool 384 varies the amount of oil communication from port 352b to port 352a to regulate the hydraulic oil pressure in main pressure line 400 at a first desired amount, for example 340.0 psi (23.0 kg/cm$^2$. The first main line pressure is reduced to lower levels when valves 354, 380, and 358 communicate hydraulic pressure to ports 352d, 352e, and 352f via lines 404, 406, and 408, respectively. Pressure at these ports acts on the spool shoulders defined by the difference in diameter of lands 384c-384f and applies a downward force on the spool to increase communication between ports 352a and 352b, thereby dumping a greater volume of oil flow to sump line 396 to decrease the pressure in main line 400.

1-3 SYNCHRO SELECTOR VALVE 354

Valve 354, which is shown enlarged in FIG. VI-B, includes a bore 410 having a relatively long bore portion 410a and a bore portion 410b of slightly greater diameter threaded at its lower end, annular ports 354a-354e, a spool 412 having lands 412a-412c, a spring 414 biasing the spool downward and reacting against a retainer pin 416 which limits upward movement of the spool, and an adapter 418 threaded into the threads of bore portion 410b until the top end 418a of the adapter sealing abuts the shoulder defined by the difference in diameter of bore portions 410a and 410b. The axial center of adapter 418 receives line 304 from logic system 118 for directing pressurized oil via a restriction 418b to and from the space between adapter end 418a and the bottom end of the spool. Adapter end 418a also limits downward movement of the spool by spring 414. As previously mentioned, ports 354a and 354e communicate directly with main pressure line 400; port 354b communicates directly with port 314b of actuator 61, with port 372a of trimmer 372, and with port 352d of regulator 352, respectively. Port 354c communicates with an exhaust 420. And port 354d communicates via a line 422 with a port 364a of trimmer 364 and with a port 314a of actuator 61.

In the absence of pressurized oil to the bottom of spool 412 via line 304 from logic 118, spring 414 maintains the spool in the downward position, as shown in FIG. IV. Hence, land 412a blocks port 354a; the space between lands 412a and 412b communicates port 354b with exhaust 420 via port 354c, thereby communicating port 314b of actuator 61 and ports 372a and 352d of valves 372 and 352 to exhaust 420 via line 404; and the space between lands 412b and 412c communicates port 354d with port 354e, thereby communicating oil from main pressure line 400 via line 422 with port 314a of actuator 61 and with port 364a of trimmer valve 364. Trimmer valve 364 dumps decreasing amounts of oil from line 422 to an exhaust 424 for controlling the rate of pressure rise at port 314a of synchro actuator 61 in a manner to be described thereinafter.

The presence of pressurized oil to the bottom of spool 412 via line 304 shifts or shuttles the spool upward until the top of the spool contacts pin 416, as shown in FIG. IV-B. With the spool in the up position the space between lands 412a and 412b communicates port 354a with port 354b, thereby communicating oil from main pressure line 400 via line 404 with port 352d of regulator 352 to reduce main line pressure in a manner previously described, with port 314b of synchro actuator 61, and with port 372a of trimmer valve 372. Trimmer valve 372, which is functionally similar to trimmer 364, dumps decreasing amounts of oil from line 404 to an exhaust 426 for controlling the rate of pressure rise at port 314b of synchro actuator 61. Also, in the up position of spool 412, land 412c blocks main line pressure at port 354e and the space between lands 412b and 412c communicates port 354d with port 354c, thereby communicating port 364a of trimmer 364 and port 314a of synchro actuator 61 to exhaust 420.

2-4 SYNCHRO SELECTOR VALVE 356

Valve 356 is identical in construction to valve 354. Hence, it should suffice to merely describe oil communications provided by the downward and upward positions of a spool 428 and lands 428a–428c defined thereby in cooperation with ports 356a–356e from top to bottom of valve 356. In the downward position of spool 428 (as shown, due to the absence of pressurized oil in line 292 from logic 118) land 428a blocks port 356a; the space between lands 428a and 428b communicates port 356b with port 356c and an exhaust 430, thereby communicating a port 380a of fourth speed signal valve 380, port 326c of actuator 97, and a port 374a of trimmer 374 with exhaust 430 via a line 432; and the space between lands 428b and 428c communicates port 356d with port 356e, thereby communicating oil from main pressure line 400 via a line 434 with a port 370a of trimmer 370 and with port 326b of actuator 97. Trimmer valve 370, which is functionally similar to trimmers 364 and 372, dumps decreasing amounts of oil from line 434 to an exhaust 435 for controlling the rate of pressure rise at port 326b of synchro actuator 97 in a manner to be described hereinafter.

The presence of pressurized oil in line 292 shifts spool 428 upward such that the space between lands 428a and 428b communicates port 356a with port 356b, thereby communicating oil from main pressure line 400 via line 432 with ports 380a, 374a, and 326c. Trimmer valve 374, which is functionally similar to trimmers 364, 372, and 370 dumps decreasing amounts of oil from line 432 to an exhaust 436 for controlling the rate of pressure rise at port 326c of synchro actuator 97 in a manner to be described hereinafter.

REVERSE SYNCHRO SELECTOR VALVE 358

Valve 358 is also indentical in construction to valves 354 and 356. Hence, as with the discussion of valve 356, it should suffice to merely describe oil communications provided by the downward and upward positions of a spool 438 and lands 438a–438c defined thereby in cooperation with ports 358a–358e from top to bottom of valve 358. In the downward position of spool 438 (as shown, due to an absence of pressurized oil in line 264 from logic 118) land 438a blocks port 358a which communicates with an exhaust 440; the space between lands 438a and 438b communicates port 358b with port 358c, thereby communicating oil from main pressure line 400 via line 408 with port 340a of actuator 116 and with port 352f of regulator 352; and the space between lands 438b and 438c communicates port 358d with port 358e which is connected to an exhaust 442, thereby communicating exhaust 442 with port 380e of valve 380, with port 340b of actuator 116, and with port 326a of actuator 97 via a line 444.

The presence of pressurized oil in line 264 shifts spool 438 upward such that the space between lands 438a and 438b communicate port 358a with port 358b, thereby communicating ports 352f and 340a with exhaust 440 via line 408; the space between lands 438b and 438c communicates port 358c with port 358d, thereby communicating oil from main pressure line 400 with ports 380e, 340b and 326a via line 444; and land 438c blocks port 358e.

SELECTOR VALVE 376

Valve 376, which is shown enlarged in FIG. IV-C, includes a stepped bore 446 having a relatively long bore portion 446a and a bore portion 446b of slightly greater diameter threaded at its upper end, annular ports 376a–376c, a spool 448 having lands 448a and 448b, a spring 450 biasing the spool upward and reacting against a retainer pin 452 which limits downward movement of the spool, and an adapter 454 threaded into bore portion 446b until the bottom end 454a of the adapter sealing abuts the shoulder defined by the difference in diameter of bore portions 446a and 446b. The axial center of adapter 454 receives line 248 from logic system 118 for directing pressurized oil via a restriction 454b to and from the space between adapter end 454a and the top of the spool. Adapter end 454a also limits upward movement of the spool by spring 450. Land 448a is provided with an annular groove 448c and one or more axial notches or restrictions 448d for connecting the space between lands 448a and 448b to port 376c when the spool is in the upward position. When the spool is fully down, as shown in FIG. IV-C, the portion of land 448a above groove 448c blocks port 376c. Port 376c communicates with an exhaust 456. Port 376b communicates via line 69 with friction clutch 48 in FIG. I and with an annular port 362a of trimmer 362. And port 376a communicates directly with main pressure line 400. Trimmer valve 362, which is functionally similar to the previously mentioned trimmer valves, dumps decreasing amounts of oil from line 69 to an exhaust 458 for controlling the rate of pressure rise in clutch 48.

In the absence of pressurized oil to the top of spool 448 via line 248 from logic system 118, spring 450 maintains the spool in the upward position, as shown in FIG. IV. Hence, land 448b blocks main line pressure at port 376a and line 69 communicates with exhaust 456 via the space between lands 448a and 448b, restrictions 448d, groove 448c, and port 376c, whereby clutch 48 is released or unapplied.

The presence of pressurized oil to the top of spool 448 via line 248, shifts or shuttles the spool downward against pin 452, as shown in FIG. IV-C. With the spool in the downward position land 448a blocks port 376c and the space between lands 448a and 448b communicates port 376a with port 376b, thereby communicating oil from main pressure line 400 via line 69 with port 362a of trimmer 362 and with clutch 48 to engage the clutch and effect completion of a shift into either the first or third speed ratios.

SELECTOR VALVE 378

Valve 378 is identical in construction to valve 376. Hence, it should suffice to merely describe oil communication provided by the upward and downward positions of a spool 460 and its lands 460a and 460b in cooperation with ports 378a–378c from bottom to top of valve 378. Port 378a communicates directly with main pressure line 400. Port 378b communicates via the line 103 with a nonannular port 380d of signal valve 380, with an annular port 368a of trimmer 368, and with friction clutch 82 in FIG. I. Port 378c communicates with an exhaust 462. Trimmer valve 368, which is functionally similar to the previously mentioned trimmer valves, dumps decreasing amounts of oil from line 103 to an exhaust 464 for controlling the rate of pressure rise in clutch 82.

In the upward position of spool 460 (as shown in FIG. IV, due to the absence of pressurized oil in line 250 from logic system 118) land 460b blocks oil from main pressure line 400 at port 378a, and line 103 communicates with exhaust 462 via the space between lands 460a, and 460b and a groove and restrictions in land 460a as in valve 376, whereby clutch 82 is disengaged. In the downward position of spool 460 port 378c is blocked by land 460a and the space between lands 460a and 460b communicates port 378a with port 378b, thereby communicating oil from main pressure line 400 via line 103 with port 380d of valve 380, with port 368a of trimmer 368 and, with clutch 82 to engage the clutch and effect completion of shifts into either the reverse, second, or fourth speed ratios.

FOURTH GEAR SIGNAL VALVE 380

Valve 380, which is shown enlarged in FIG. IV-D, communicates main line pressure to port 352e of regulator 352 to reduce main line pressure when spool 460 of clutch selector valve 378 is shifted downward to apply clutch 82 for a fourth speed ratio upshift. Valve 380 includes a stepped bore 466 having bore portions 466a and 466b, ports 380a–380e, a spool 468 having lands 468a and 468b, and a spring 470 biasing the spool upward against a shoulder formed by the difference in diameter of bore portions 466a and 466b. Spring 470 reacts against a plug 472 sealing the lower end of bore portion 466b. The top of bore portion 466a is blind. As previously mentioned, port 380a communicates via line 432 with port 356b of 2-4 synchro selector 356, port 380c communicates via line 406 with port 352e of regulator 352, port 380d communicates via line 103 with port 378b of selector valve 378, and port 380e communicates via line 444 with port 358d of reverse selector valve 358. Port 380b communicates with an exhaust 474.

When spool 468 is in the upward position, as shown in FIG. IV, the space between lands 468a and 468b communicates line 406 with exhaust 474 and land 468b blocks port 380d. Spool 468 is shifted downward by the presence of pressurized oil at port 380a from 2-4 synchro selector valve 356 in response to an upward shift of spool 428 therein. Spool 428 of valve 356 is shifted up to initiate shifts into both the fourth and reverse speed ratios. With spool 468 in the downward position as shown in FIG. IV-D, the space between lands 468a and 468b communicates line 103 with line 406 via ports 380c and 380d and land 468a blocks port 380b. Hence, when spool 460 of selector valve 378 is shifted downward to complete a fourth speed ratio shift, pressurized oil from line 103 flows to port 352e to reduce main line pressure in response to the oil pressure acting downward on the shoulder defined by the difference in diameter of lands 384d and 384e of spool 384.

During a reverse speed ratio shift, when logic system 118 applies oil pressure to line 264 to move the spool of reverse selector valve 358 upward to initiate engagement of reverse synchronizer-jaw clutch 84, the logic also applies oil pressure to line 292 to move the spool in 2-4 synchro selector 356 upward, thereby communicating main line pressure to line 432 to ensure neutral positioning of piston 332 in 2-4 synchro actuator 97, as previously explained. The pressure in line 432, which would normally move the spool in valve 380 down, is countered by main line pressure applied to port 380e via line 444 from reverse selector valve 358, this pressure in combination with the force of spring 470 maintains spool 468 in the up position.

THIRD SPEED SYNCHRO TRIMMER VALVE 372

Valve 372, as previously mentioned, controls the rate of pressure rise in line 404 connecting 1-3 synchro selector 354 with port 314b of 1-3 synchro actuator 61, thereby controlling the rate of pressure rise acting on the left side of piston 320 and the engaging force of the synchronizing friction clutch portion of 1-3 synchronizer-jaw clutch 42 while third speed ratio gear 46 is being synchronized with countershaft 40. Hence, when the friction clutch portion is first engaged and the speed difference between the gear and countershaft is the greatest, the engaging force of the synchronizing friction clutch portion is relatively low. The pressure and engaging force then rises over a predetermined time period while the speed difference decreases to zero or synchronism. By controlling or increasing the engaging force of the synchronizer clutch as the speed difference thereacross diminishes the instantaneous horsepower absorbed by the synchronizer clutch is maintained relatively constant during the synchronizing period.

Valve 372, which is shown enlarged in FIG. IV-E, includes a stepped bore 476 having a relatively long bore portion 476a and a relatively short bore portion 476b of smaller diameter; annular ports 372a and 372b; a stepped spool 478 having lands 478a and 478b, an extension 478c, and a restricted passage 478d; and a piston 480 biased against extension 478c by a spring 482 reacting against a plug 484 secured in bore portion 476a. Plug 484 includes an open centered extension which limits downward travel of piston 480 and vents the space containing spring 482 to exhaust. As previously mentioned, port 372a communicates with line 404. Port 372b communicates with the exhaust 426.

When spool 478 is in the full upward position, as shown in FIG. IV, land 478b blocks communication between ports 372a and 372b. As spool 478 moves downward, land 478b moves out of sealing contact with bore portion 476b, thereby allowing oil communication from port 372a to exhaust 426 via port 372b to regulate the pressure rise of oil in line 404 and accordingly the force acting on piston 320 of actuator 61. When spool 412 in 1-3 synchro selector valve 354 is shifted upward, oil from main pressure line 400 flows via line 404 to the left side of piston 320 and to port 372a. The oil pressure on the left side of piston 320 and at port 372a simultaneously and quickly builds up to a first predetermined level sufficient for the oil pressure acting on the smaller diameter of the spool to counter the upward force of spring 482 and move the spool downward enough to effect oil flow from port 372a to exhaust 426. At the same time the pressurized oil flows through restricted passage 478d of spool 478 into the space between the spool and piston 480. As seen in FIG. IV-E, the oil gradually separates the spool and piston as its volume increases, thereby increasing the upward force acting on the spool as the spring 482 compresses. The spool moves upward in response to the increasing upward force and gradually reduces the amount of oil flow to exhaust 426, thereby increasing the pressure in line 404 and accordingly the force acting on piston 320 at a rate determined by the size of restriction 478d and the spring rate of spring 482.

A graph in FIG. V illustrates the pressure rise in line 404 with respect to time. The pressure rises rather quickly to a first predetermined level A; the pressure then rises along a path to a level B at rate controlled by the size of restriction 478d and the spring rate of spring 482. At level B oil flow to exhaust 426 is completely blocked by land 478b; hence, the oil pressure then rises abruptly to main line pressure at a level C. The path between levels A and B, shown as linear for simplicity in FIG. V, may be curved.

As previously mentioned, transmission 10 is a preselection transmission wherein the synchronizer-jaw clutch for the next upshift or downshift is moved from one ratio engaging position to another while its respective power shift friction clutch 48 or 82 is disengaged and drive is through another synchronizer-jaw clutch on the other countershaft. That is, when the synchronizer-jaw clutches are shifted between ratio positions the engaged jaw clutch portion therein is not transmitting torque and is therefore moved out of engagement by its respective actuator in response to relatively low oil pressures equal to or slightly below pressure level A in FIG. V. More specifically, when pressurized oil is communicated to the left side of piston 320, pressure levels below level A move the piston rightward to disengage the jaw clutch portion of clutch 42 coupling first speed ratio gear 44 to countershaft 40; the piston continues to move rightward engaging the synchronizer and blocker portions of clutch 42; the synchronizer portion frictionally couples third speed ratio gear 46 to countershaft 40 at or about pressure level A and the blocker portion prevents engagement of the jaw clutch portion; thereafter, the pressure rises along the curve from level A to level B. By the time the pressure reaches level B synchronism is reached, whereby the blocker portion of clutch 42 unblocks and allows engagement of the jaw clutch portion of clutch 42 to effect a positive coupling between third speed ratio gear 46 and countershaft 40.

Prior art trimmer valves, similar to valve 372, have been used to control the rate of pressure rise in powershift clutches such as clutches 48 and 82. Therein, the purpose of the trimmer was to control shift smoothness when shifting between ratios. Herein, the trimmer controls the instantaneous amount of horsepower absorbed by the synchronizer portion of clutch 42 at or near an amount which will minimize wear of the friction surfaces of the synchronizer portion while at the same time maintaining a relatively short synchronizing period. For example, friction materials such as bronze against steel have been found to have a maximum wear lift when the instantaneous horsepower absorbed is less than 0.5 horsepower per square inch of friction surface.

FOURTH SPEED SYNCHRO TRIMMER VALVE 374

Valve 374 is indentical structurally and functionally to valve 372. Hence, it should suffice to say that valve 374 controls pressure rise in line 432 to maintain the horsepower absorbed by the synchronizer portion of clutch 74 at less than 0.5 horsepower per square inch of friction surface while fourth speed ratio gear 78 is being synchronized with countershaft 72.

COMBINATION TRIMMER VALVE 360

Valve 360, as previously mentioned, includes 1-3 powershift clutch trimmer valve 362 and 1st speed synchronizer clutch trimmer valve 364 for respectively controlling the rate of pressure rise in line 69 to clutch 48 and the rate of pressure rise in line 422 to synchro actuator 61. The purpose of valve 364 is the same as valves 372 and 374. The purpose of valve 362 is the same as other prior art trimmer valves, that is, to control shift smoothness when shifting between ratios with powershift friction clutches such as clutches 48 and 82. However, since the powershift friction clutches in transmission 10 each couple two or more speed ratios, a single trimmer pressure rise or pressure schedule such as shown in FIG. V provides less than desired results. As may be seen in FIG. VI, valve 362 is constructed in combination with valve 364 such that the rate of pressure rise in line 69 follows a curve or path D, E, F when clutch 48 is being engaged to complete a first speed ratio shift and follows a curve or path G, H, F' when clutch 48 is being engaged to complete a third speed ratio shift. Pressure paths D, E, F and G, H, F' correspond to force paths for controlling the oncoming engagement rate of powershift clutch 48.

Valve 360 is shown enlarged in FIG. IV-F. Valves 362 and 364 are contained in a common stepped bore 486 having a short bore portion 486a and a relatively long bore portion 486b of greater diameter. Valve 362 includes annular ports 362a and 362b; the exhaust 458 connected to port 362b; a stepped spool 488 having lands 488a and 488b, a short extension 488c, and a restricted passage 488d; and a piston 490 biased upward by a preloaded spring 492 which also biases a piston 494 of valve 364 downward. The space between pistons 490 and 494 is vented to an exhaust 496 and also contains a free length spring 498 and a stop or spacer sleeve 500. Valve 364, which is disposed in bore 486 in mirror image fashion with respect to valve 362, includes an end cap 502, a stepped spool 504, the piston 494, ports 364a and 364b, the exhaust 424 connected to port 364b, and the springs 492 and 498 shared with valve 362. End cap 502, which is secured in the bottom of bore portion 486b by a snap ring, includes a bore portion 502a analogous to bore portion 486a, a plurality of passages 502b connected with an annular groove 502c for communicating bore portion 502a with port 364a, and an extension portion 502d having a stop nut 506 at its upper end. Stepped spool 504 includes lands 504a and 504b, a central opening 504c slidably and sealingly receiving extension 502d, a raised ring portion 504d analogous to extension 488c and a restricted passage 504e. Piston 494 includes a central opening 494a slidably and sealingly receiving extension 502d.

Trimmer valve 364 is functionally substantially the same as trimmer valve 372. When 1-3 synchro selector 354 communicates main pressure line 400 with line 422, spool 504 moves upward and land 504a moves out of sealing contact with bore portion 502a, thereby allowing oil communication from port 364a to exhaust 424 to regulate the pressure rise of oil in line 422 and accordingly the force acting on piston 320 of synchro actuator 61. At the same time, the pressurized oil acting on spool 504 flows through restricted passage 504e into the space between spool 504 and piston 494. The oil gradually separates the spool and piston as its volumn increases, thereby increasing the downward force acting on the spool as piston 494 moves upward toward stop nut 506. Upward movement of piston 494 first compresses spring 492 and then spring 498 just before the stop nut arrests further upward movement of the piston. The pressure rise in line 422 is substantially as shown in FIG. V. When piston 494 contacts the stop nut, the oil pressure between the spool and piston quickly rises to the oil pressure level on the lower side of the spool. Since the upper surface area of the spool is greater than the lower surface area, the spool moves downward and land 504a moves into sealing contact with bore portion 502a.

Looking now at valve 362, when clutch selector valve 376 communicates main pressure line 400 with line 69, spool 488 moves downward and land 488a moves out of sealing contact with bore portion 486a, thereby allowing oil communication from port 362a to exhaust 458 to regulate the oil pressure in line 69 at a first or second initial level determined by the smaller diameter area of spool 488 and the initial or preload force of the spring(s) acting on piston 490. When piston 494 of valve 364 is in the downward position shown in FIG. IV, the first initial level coincides with point G in FIG. VI. When spool 494 is in the up position against stop nut 506, as shown in FIG. IV-F, the second initial level coincides with point D in FIG. VI. The pressurized oil acting on the smaller diameter area of spool 488 also flows through restricted passage 488d into the space between the spool and piston 490. The oil gradually separates the spool and piston as its volume increases, thereby increasing the upward force acting on the spool as piston 490 moves downward toward stop sleeve 500. When piston 494 is in the down position, downward movement of piston 490 first compresses spring 492 and then spring 498. When piston 494 is in the up position, both springs are compressed during full downward travel of piston 490. When piston 490 contacts the stop sleeve, the oil pressure between the spool and piston quickly rises to the oil pressure level acting on the top or smaller diameter surface area of spool 488. Since the lower surface area of the spool is greater than the upper surface area, the spool moves upward and land 488a moves onto sealing contact with bore portion 486a. From the foregoing it should be clear that piston 494 functions as a pressure control means for valve 362. When piston 494 is down the extension of springs 492, 498 are a maximum and the fluid pressure at port 462a rises along path G, H, F'. When the piston is up, the extension of spring 492, 498 are a minimum and the pressure at port 462a rises along path D, E, F.

Looking now at a transmission shift in to the first speed ratio, e.g., a downshift into the first speed ratio, logic system 118 anticipates the downshift and sends a first speed signal to 1-3 synchro selector valve 354 in the form of an absence of pressure in line 304, whereby the spool in valve 354 moves downward and communicates main pressure line 400 with trimmer valve 364 and synchro actuator 61 via line 422. Trimmer valve 364 regulates the pressure rise in line 422 in accordance with curve A, B, C in FIG. V while piston 320 moves synchronizer-jaw clutch 42 leftward to synchronize and jaw clutch first speed ratio gear 44 with countershaft 40 over a predetermined time period. Following this period and while piston 494 is in the up position against stop nut 506, the logic system sends another first speed shift signal to clutch selector valve 376 in the form of an absence of pressure in line 248, whereby the spool in valve 376 moves upward and communicates main pressure line 400 with trimmer valve 362 and power shift clutch 48 via line 69. Since springs 492 and 498 are partially compressed, the pressure in line 69 rises in accordance with curve D, E, F in FIG. VI, thereby providing a smooth and controlled rate of engagement of clutch 48 for a first speed ratio shift.

When the transmission is shifted into the third speed ratio, the spool in 1-3 selector valve is up and trimmer valve line 422 is communicated with exhaust 420. Hence, piston 494 is down, whereby pressure in line 69 rises in accordance with curve G, H, F' in FIG. VI.

COMBINATION TRIMMER VALVE 366

Valve 366, as previously mentioned, includes 2-4 powershift clutch trimmer valve 368 and 2nd speed synchronizer clutch trimmer valve 370 which are identical in structure and function to valves 362 and 364 with the exception of an additional annular port 370c. Port 370c communicates the space between the piston and spool of valve 370 with line 444 via a check valve 508 which allows oil flow from line 444 into the space between the piston and spool and prevents flow therefrom into line 444. Hence, the springs biasing the piston of valve 368 are partially compressed when a shift into second and reverse is made. Valve 370 regulates the pressure rise in line 434 in accordance with curve A, B, C in FIG. V. When power shift friction clutch 82 is being engaged to complete a shift into second or reverse, valve 368 regulates the pressure rise in line 103 to clutch 82 in accordance with curve D, E, F in FIG. VI. When clutch 82 is being engaged to complete a shift into fourth, valve 368 regulates the pressure in accordance with curve G, H, F' in FIG. VI.

ALTERNATIVE EMBODIMENT

Components in the alternative embodiment of FIGS. VII and VIII which are the same as components in previously discussed figures will be given the same reference numbers suffixed with a prime.

In the embodiment of FIG. III the annular ports and lands of manual valve 122 cooperate with certain of the other valves in FIG. III to provide engagement of the first and second speed ratio jaw clutch portions of synchronizer-jaw clutches 42 and 74 whenever the manual valve spool 158 is in the neutral position and the vehicle speed is below the 2-3 upshift level of synchro shift valve 138. Further, with respect to FIG. III, initial movement of the manual valve spool 158 to the reverse position initiates the previously discussed reverse speed ratio engagement sequence wherein reverse timer valve 124 time delays engagement of powershift friction clutch 82 for a predetermined time period sufficient to insure neutral positioning of 2-4 synchronizer-jaw clutch 74 and engagement of jaw clutch portion of reverse synchronizer-jaw clutch 84.

This time delay can seem unduly long to a vehicle operator when the operator initially selects reverse; this is so particularly when reverse is initially selected with the vehicle not moving and with the manual valve spool having been in the neutral position for a time period in excess to the delay time period of reverse timer valve 134.

Looking now at the alternative embodiment of FIG. VII and VIII, therein is illustrated a modified manual valve 700 which may be used in lieu of manual valve 120 in FIG. III. Valve 700 provides for neutral positioning of synchronizer-jaw clutch 74 and engagement of the reverse synchronizer-jaw clutch when a spool 702 of manual valve 700 is in the neutral or reverse positions. Manual valve 700 differs from manual valve 120 only with respect to oil porting at the top of the valve. To wit, manual valve 700 includes a nonannular port 704 in lieu of annular port 122c of valve 120 and an added annular port 706. Nonannular port 704 is connected to a line 160' and annular port 706 is connected to a reverse signal line 162'. Lines 160' and 162' respectively connect into the logic system of FIG. III in the same manner as lines 160 and 162. Further, lines 160' and 162' both receive pressurized oil from a line 142d' and the space between lands 702a, 702b. Line 142d' and lands 702a, 702b are respectively the same as line 142d and lands 158a, 158b in FIG. III. Lines 142e', 164', 166', 168', 170' and 172' respectively connect to valve 700 in the same manner as lines 142e, 164, 166, 168, 170, and 172.

As shown in FIG. VIII, with manual valve spool 702 in the neutral position land 702a (equivalent to land 158a) blocks nonannular port 704 to prevent engagement of powershift clutch 82; however, added annular port allows pressurized oil to line 162' to initiate the reverse speed ratio engagement sequence for the synchronizer clutch portion of the sequence. Hence, when spool 702 is moved to the reverse position of FIG. VII, powershift clutch 82 is engaged without the time delay.

The control system embodiment and alternative valve embodiment therefore have to be disclosed for illustrative purposes. Many variations of the disclosed embodiments are believed to be within the spirit of the inventions therein. The following claims are intended to cover inventive portions of the disclosed embodiments and modifications believed to be within the spirit of the inventions therein.

What is claimed is:

1. In a powershift, preselect transmission of the type including a plurality of multiple ratio gear power paths alternately connectable between input and output shafts by first engaging selected ones of clutch means associated with each gear and then alternately engaging a powershift clutch associated with each path and an improved control system comprising:
   shift selector means moveable between forward, neutral, and reverse positions; and
   reverse means for effecting engagement of the clutch means associated with a reverse speed ratio gear in one of said paths in response to said neutral positioning of said shift selector means.

2. In a preselect transmission of the type including a plurality of power paths alternately connectable between input and output shafts by first engaging selected ones of synchronizer clutches associated with each of a plurality of forward speed ratio gears in each path and then alternately engaging a powershift clutch associated with each path, and an improved control system comprising:
   shift selector means including means moveable between forward, neutral, and reverse positions; and
   reverse means operative to effect engagement of the synchronizer clutch associated with a reverse speed ratio gear in one of said paths in response to said neutral positioning of said shift selector means.

3. The transmission of claim 1 or 2, further including signal means providing a speed signal proportional to the output shaft speed and wherein said reverse means further includes means responsive to said speed signal for preventing engagement of the clutch associated with said reverse gear while said speed signal is above a predetermined magnitude.

4. In a transmission of the type including input and output shafts; a plurality of power paths disconnectable from both shafts; a plurality of forward speed ratio gears associated with one path and in constant driving relation with one of the shafts; at least one forward and one reverse speed ratio gear associated with another path and in constant driving relation with the one shaft; clutch means associated with each gear and selectively engageable to connect one of the gears with the associated path while the path is otherwise disconnected from the shafts; a powershift clutch associated with each path and alternately engageable to complete driving communications between the shafts via the selected one gears for up, down, and reverse shifting the transmission; and an improved control system comprising:
   shift selector means including means moveable between forward, neutral, and reverse positions; and
   reverse means operative to effect engagement of the clutch means associated with the reverse gear in response to neutral positioning of said shift selector means position.

5. The transmission of claim 4, further including signal means providing a speed signal proportional to the output shaft speed and wherein said reverse means includes means responsive to said speed signal for preventing engagement of the clutch means associated with said reverse gear while said speed signal is above a predetermined magnitude.

6. The transmission of claim 5, wherein said shift selector is operative in said neutral position to provide a reverse signal and said reverse means includes means responsive to said speed signal and to said reverse signal for respectively effecting engagement and disengagement of said clutch means.

7. The transmission of claim 5, further including a regulated fluid pressure; wherein said signal means provides a proportional fluid pressure defining said speed signal; wherein said selector means includes a valve connected to the regulated pressure and having a valving member movable between said forward, neutral, and reverse positions and operative in said neutral position to direct the regulated pressure to a reverse signal line; and wherein said reverse means includes:
   a reverse sequence valve having a first port connected to said regulated pressure, a second port connected to said reverse signal line, a third port for directing regulated pressure from said first port to effect engagement of the clutch means associated with the reverse gear, and a valving member respectively biased between first and second positions by said proportional pressure and pressure in said reverse signal line for respectively blocking and allowing flow of said regulated pressure from said first port to said third port.

* * * * *